(12) United States Patent
You et al.

(10) Patent No.: US 12,418,954 B2
(45) Date of Patent: Sep. 16, 2025

(54) COMMUNICATION METHOD AND APPARATUS FOR SMALL DATA TRANSMISSION

(71) Applicant: HUAWEI TECHNOLOGIES CO., LTD., Guangdong (CN)

(72) Inventors: Chunhua You, Shanghai (CN); Xiaoying Xu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 18/474,937

(22) Filed: Sep. 26, 2023

(65) Prior Publication Data

US 2024/0015834 A1 Jan. 11, 2024

Related U.S. Application Data

(63) Continuation of application No. PCT/CN2022/083149, filed on Mar. 25, 2022.

(30) Foreign Application Priority Data

Mar. 31, 2021 (CN) .......................... 202110349588.1

(51) Int. Cl.
*H04W 76/20* (2018.01)
*H04W 72/1268* (2023.01)
(Continued)

(52) U.S. Cl.
CPC ....... *H04W 76/20* (2018.02); *H04W 72/1268* (2013.01); *H04W 72/232* (2023.01); *H04W 76/30* (2018.02)

(58) Field of Classification Search
CPC ..... H04W 76/00; H04W 76/20; H04W 76/27; H04W 76/30; H04W 76/34; H04W 72/20;
(Continued)

(56) References Cited

U.S. PATENT DOCUMENTS

2020/0092771 A1* 3/2020 Ohlsson ............ H04W 36/0079
2022/0022247 A1* 1/2022 Agiwal ............. H04W 72/0453
(Continued)

FOREIGN PATENT DOCUMENTS

| CN | 111757557 A | 10/2020 |
| WO | 2020204501 A1 | 10/2020 |
| WO | 2021045339 A1 | 3/2021 |

OTHER PUBLICATIONS

Extended European Search Report in European Appln No. 22778800.7, dated Jul. 19, 2024, 9 pages.
(Continued)

*Primary Examiner* — Warner Wong
(74) *Attorney, Agent, or Firm* — Fish & Richardson P.C.

(57) ABSTRACT

This application provides a communication method and apparatus. One example method includes receiving, by a central unit of a first network device, a retrieve user equipment (UE) context request from a second network device; sending, by the central unit of the first network device, a context of a terminal device in an inactive state to the second network device; and upon receiving the retrieve UE context request, sending, by the central unit of the first network device, a first message to a distributed unit of the first network device, where the first message indicates the distributed unit of the first network device to release a context of the terminal device.

21 Claims, 10 Drawing Sheets

(51) Int. Cl.
*H04W 72/232* (2023.01)
*H04W 76/30* (2018.01)

(58) Field of Classification Search
CPC ... H04W 72/23; H04W 72/232; H04W 72/12; H04W 72/1263; H04W 72/1268; H04W 28/00; H04W 28/02; H04L 67/142; H04L 63/12
See application file for complete search history.

(56) References Cited

U.S. PATENT DOCUMENTS

| | | | |
|---|---|---|---|
| 2022/0286355 A1* | 9/2022 | Park | H04W 24/02 |
| 2022/0330109 A1* | 10/2022 | Ohlsson | H04W 76/27 |
| 2022/0338298 A1* | 10/2022 | Xu | H04W 52/0229 |
| 2024/0015834 A1* | 1/2024 | You | H04W 72/1268 |
| 2024/0324039 A1* | 9/2024 | Wu | H04W 36/12 |

OTHER PUBLICATIONS

3GPP TR 33.809 V0.14.0, "3rd Generation Partnership Project; Technical Specification Group Services and System Aspects Study on 5G Security Enhancement against False Base Stations (FBS) (Release 17 )," Mar. 2021, 109 pages.
Office Action in Japanese Appln. No. 2023-560737, mailed on Sep. 17, 2024, 10 pages (with English translation).
3GPP TS 38.401 V16.4.0, "3rd Generation Partnership Project; Technical Specification Group Radio Access Network; NG-RAN; Architecture description(Release 16)," Jan. 2021, 78 pages.

* cited by examiner

COMMUNICATION METHOD AND APPARATUS FOR SMALL DATA TRANSMISSION

CROSS-REFERENCE TO RELATED APPLICATIONS

This application is a continuation of International Application No. PCT/CN2022/083149, filed on Mar. 25, 2022, which claims priority to Chinese Patent Application No. 202110349588.1, filed on Mar. 31, 2021. The disclosures of the aforementioned applications are hereby incorporated by reference in their entireties.

TECHNICAL FIELD

Embodiments of this application relate to the field of communication technologies, and in particular, to a communication method and apparatus.

BACKGROUND

In discussion of the 5th generation (5G), it is decided to introduce a new radio resource control (RRC) state, namely, an inactive state, in the standard. A terminal device suspends a radio resource control (RRC) connection to a network, to achieve a power saving effect same as that in an idle state. Different from the idle state, in the inactive state, the terminal device and an access network device store a context of the terminal device. When the terminal device needs to enter a connected state, for example, the terminal device needs to send uplink data, or when a network device pages the terminal device to enter the connected state, the terminal device enters the connected state based on the stored context of the terminal device, so as to reduce a delay and reduce signaling overheads.

In this manner, the terminal device in the idle state or the inactive state needs to enter the connected state to transmit data to the network device. For even a small data packet that is not transmitted frequently, unnecessary power consumption and signaling overheads are caused. Therefore, in a possible manner, when transmitting small data in the inactive state, the terminal does not need to enter the connected state.

It is considered that after the terminal leaves coverage of the original access network device that stores the context, the terminal needs to initiate an RRC resume procedure to a new access network device. How to properly manage a resource (for example, the context) of the terminal in this scenario, especially when the access network device includes a central unit (CU) and one or more distributed units (DU), that is, in a CU-DU split scenario, how to ensure that transmission of the small data is not affected in a moving process of the terminal is still under discussion.

SUMMARY

Embodiments of this application provide a communication method and apparatus, to improve small data transmission performance of a terminal device in a moving process of the terminal device.

According to a first aspect, this application provides a communication method, including: A central unit of a first network device sends first indication information to a terminal device via a distributed unit of the first network device. The first indication information indicates a first resource of a configured grant of the terminal device, and the first resource is associated with a first synchronization signal broadcast channel block (SSB). The first SSB is used by the terminal device to determine, in an inactive state, whether to send data by using the first resource.

According to the foregoing method, when the first network device indicates the first resource of the configured grant to the terminal device, the corresponding resource may be associated with the SSB, for example, the first SSB is associated with the first resource, so that the terminal device may determine, in the inactive state by using the first SSB associated with the first resource, whether to send data by using the first resource. This prevents the network device from sending additional signaling to the terminal device to indicate when the terminal device transmits small data by using the configured grant resource. In addition, the terminal device does not need to enter a connected state to receive related signaling. This improves efficiency of transmitting small data by the terminal device in the inactive state, and reduces a delay of transmitting small data by the terminal device in the inactive state.

In a possible implementation, that first SSB is used by the terminal device to determine, in the inactive state, whether to send data by using the first resource includes: Reference signal received power (RSRP) of the first SSB is used to: determine whether uplink synchronization of the first resource is invalid; and when it is determined that uplink synchronization of the first resource is valid, determine to send data by using the first resource; or when it is determined that uplink synchronization of the first resource is invalid, determine not to send data by using the first resource.

According to the foregoing method, it is determined, based on whether uplink synchronization of the first SSB is invalid, whether the first resource of the configured grant that is used for small data transmission and that is associated with the first SSB can be used by the terminal device to transmit small data in the inactive state. Therefore, signaling interaction between the terminal device and the first network device can be reduced, transmission performance of small data in the inactive state can be improved, and a transmission delay can be reduced.

Optionally, when it is determined that uplink synchronization of the first resource is invalid, it is determined to release the first resource. Therefore, the terminal device can release a corresponding resource in time, and the terminal device is prevented from transmitting small data by using an invalid resource, thereby improving a transmission success rate of the terminal device.

In a possible implementation, that the RSRP of the first SSB is used to determine whether uplink synchronization of the first resource is invalid includes: When the RSRP of the first SSB is greater than or equal to a first threshold, it is determined that uplink synchronization of the first resource is valid. When an increase variation of the RSRP of the first SSB is greater than or equal to a second threshold, or when a decrease variation of the RSRP of the first SSB is greater than or equal to a third threshold, it is determined that uplink synchronization of the first resource is invalid.

According to the foregoing method, whether the first SSB is invalid may be determined based on the RSRP of the first SSB, so as to correspondingly determine whether the first resource of the configured grant that is used for small data transmission and that is associated with the first SSB can be used by the terminal device to transmit small data in the inactive state. By determining that the SSB is invalid and by determining the SSB associated with the configured grant resource, complexity of determining, by the terminal, whether the transmission resource is valid can be reduced, and transmission efficiency can be improved.

In a possible implementation, the central unit of the first network device sends second indication information to the terminal device via the distributed unit of the first network device. The second indication information indicates a second resource of the configured grant of the terminal device, and the second resource is used by the terminal device to send data by using the second resource in the inactive state and the connected state.

According to the foregoing method, in a switching process between the inactive state and the connected state, the terminal device can transmit small data by using the indicated second resource regardless of whether the terminal device is in the inactive state or the connected state. This avoids impact of the switching process on small data transmission, and a corresponding resource does not need to be reconfigured for the terminal device after the switching, thereby improving efficiency and performance of transmitting small data by the terminal device.

In a possible implementation, the central unit of the first network device sends a context of the terminal device in the inactive state to a second network device. The central unit of the first network device sends a first message to the distributed unit of the first network device, where the first message indicates the distributed unit of the first network device to release the context of the terminal device.

According to the foregoing method, in a process in which the central unit of the first network device sends the context of the terminal device in the inactive state to the second network device, the first network device may determine that the terminal device is currently handed over to the second network device, to indicate the distributed unit of the first network device in time to release the context of the terminal device. In this way, the distributed unit of the first network device can release the context of the terminal device in time in a process of transmitting small data by the terminal device as the terminal device is handed over to the second network device. This improves utilization of a resource corresponding to the context of the terminal device by the distributed unit of the first network device, and improves overall network performance.

In a possible implementation, before the central unit of the first network device sends a context of the terminal device in the inactive state to a second network device, the method further includes: The central unit of the first network device receives a retrieve context request of the terminal device from the second network device.

According to the foregoing method, the first network device may determine, based on the retrieve context request of the terminal device that is sent by the second network device, that the second network device is a network device to which the terminal device is to be handed over. This helps the first network device manage the context of the terminal device, and reduces resource overheads while ensuring that the terminal device can successfully transmit small data in a handover process.

In a possible implementation, before the central unit of the first network device sends a context of the terminal device in the inactive state to a second network device, the method further includes: The central unit of the first network device successfully verifies an identity of the second network device.

According to the foregoing method, after successfully verifying the identity of the second network device, the central unit of the first network device indicates the distributed unit of the first network device to release the context of the terminal device. This reduces resource overheads when security of the second network device is ensured, that is, when the terminal device can be successfully handed over to the second network device, and avoids a problem that the terminal device may be frequently handed over to the network device.

In a possible implementation, the context includes one or more of the following:
  a configured grant configured for the terminal device;
  configuration information of a physical downlink control channel (PDCCH) configured for the terminal device;
  a temporary identifier for scrambling the PDCCH;
  an inactive radio network temporary identifier (I-RNTI) for the terminal device; and
  configuration information of a radio link control (RLC) layer corresponding to a radio bearer configured for the terminal device.

According to a second aspect, this application provides a communication method. A second network device sends first indication information to a terminal device. The first indication information indicates a first resource of a configured grant of the terminal device, the first resource is associated with a first SSB, and the first SSB is used by the terminal device to determine, in an inactive state of the terminal device, whether to send data by using the first resource.

It should be noted that the second network device may be a network device to which the terminal device is handed over from a first network device, or may be a network device before the terminal device is handed over from the first network device. According to the foregoing method, when the second network device indicates the first resource of the configured grant to the terminal device, the corresponding resource may be associated with the SSB, for example, the first SSB is associated with the first resource, so that the terminal device may determine, in the inactive state by using the first SSB associated with the first resource, whether to send data by using the first resource. This prevents the network device from sending additional signaling to the terminal device to indicate when the terminal device transmits small data by using the configured grant resource. In addition, the terminal device does not need to enter a connected state to receive related signaling. This improves efficiency of transmitting small data by the terminal device in the inactive state, and reduces a delay of transmitting small data by the terminal device in the inactive state.

In a possible implementation, that first SSB is used by the terminal device to determine, in the inactive state, whether to send data by using the first resource includes: An RSRP of the first SSB is used to: determine whether uplink synchronization of the first resource is invalid; and when it is determined that uplink synchronization of the first resource is valid, determine to send data by using the first resource; or when it is determined that uplink synchronization of the first resource is invalid, determine to release the first resource.

In a possible implementation, that the RSRP of the first SSB is used to determine whether uplink synchronization of the first resource is invalid includes: When the RSRP of the first SSB is greater than or equal to a first threshold, it is determined that uplink synchronization of the first resource is valid. When an increase variation of the RSRP of the first SSB is greater than or equal to a second threshold, or when a decrease variation of the RSRP of the first SSB is greater than or equal to a third threshold, it is determined that uplink synchronization of the first resource is invalid.

In a possible implementation, the second network device sends second indication information to the terminal device.

The second indication information indicates a second resource of the configured grant of the terminal device, and the second resource is used by the terminal device to send data by using the second resource in the inactive state and a connected state.

According to the foregoing method, in a switching process between the inactive state and the connected state, the terminal device can transmit small data by using the indicated second resource regardless of whether the terminal device is in the inactive state or the connected state. This avoids impact of the switching process on small data transmission, and a corresponding resource does not need to be reconfigured for the terminal device after the switching, thereby improving efficiency and performance of transmitting small data by the terminal device.

In a possible implementation, the second network device receives a context of the terminal device in the inactive state from a central unit of a first network device. The context is used by the second network device to restore the terminal device to the connected state.

According to the foregoing method, when the second network device determines that the terminal device is currently switched from the inactive state to the connected state, the second network device may obtain the context of the terminal device from the central unit of the first network device before the switching, so that the terminal device does not need to re-initiate access in a process of switching from the inactive state to the connected state, and may transmit small data based on the second resource configured by the second network device, thereby avoiding impact of a state switching process of the terminal device on small data transmission.

In a possible implementation, the context includes one or more of the following: a configured grant configured for the terminal device; configuration information of a PDCCH configured for the terminal device; a temporary identifier for scrambling the PDCCH; an inactive I-RNTI configured for the terminal device; and configuration information of an RLC layer corresponding to a radio bearer configured for the terminal device.

According to a third aspect, this application provides a communication method. A terminal device receives, via a distributed unit of a first network device, first indication information sent by a central unit of the first network device. The first indication information indicates a first resource of a configured grant of the terminal device, and the first resource is associated with a first SSB. The terminal device determines, in an inactive state based on the first SSB, whether to send data by using the first resource.

According to the foregoing method, the first SSB is associated with the first resource, so that the terminal device may determine, in the inactive state, whether to send data by using the first resource based on the first resource of the configured grant indicated by the first network device to the terminal device and a corresponding resource associated with the SSB, for example, by using the first SSB associated with the first resource. This prevents the network device from sending additional signaling to the terminal device to indicate when the terminal device transmits small data by using the configured grant resource. In addition, the terminal device does not need to enter a connected state to receive related signaling. This improves efficiency of transmitting small data by the terminal device in the inactive state, and reduces a delay of transmitting small data by the terminal device in the inactive state.

According to a fourth aspect, a communication method is provided. A terminal device receives first indication information sent by a second network device. The first indication information indicates a first resource of a configured grant of the terminal device, and the first resource is associated with a first SSB. The terminal device determines, in an inactive state based on the first SSB, whether to send data by using the first resource.

It should be noted that the second network device may be a network device to which the terminal device is handed over from a first network device, or may be a network device before the terminal device is handed over from the first network device.

According to the foregoing method, after the terminal device is handed over from the first network device to the second network device, the first SSB is associated with the first resource, so that the terminal device may determine, in the inactive state, whether to send data by using the first resource based on the first resource of the configured grant indicated by the second network device to the terminal device and a corresponding resource associated with the SSB, for example, by using the first SSB associated with the first resource. This improves efficiency of transmitting small data by the terminal device in the inactive state, and reduces a delay of transmitting small data by the terminal device in the inactive state. In addition, after the terminal device is handed over from the second network device to the first network device, the terminal device may still determine, based on the first resource configured by the second network device for the terminal device, whether small data can be transmitted, and the first network device does not need to reconfigure a corresponding configured grant small data resource. This improves performance of transmitting small data by the terminal device.

With reference to the third aspect or the fourth aspect, in a possible implementation, that the terminal device determines, in an inactive state based on the first SSB, whether to send data by using the first resource includes: The terminal device determines, based on reference signal received power RSRP of the first SSB, whether uplink synchronization of the first resource is invalid. When determining that uplink synchronization of the first resource is valid, the terminal device determines to send data by using the first resource. When determining that uplink synchronization of the first resource is invalid, the terminal device determines not to send data by using the first resource.

With reference to the third aspect or the fourth aspect, in a possible implementation, the terminal device releases the first resource when determining that uplink synchronization of the first resource is invalid.

With reference to the third aspect or the fourth aspect, in a possible implementation, that the terminal device determines, based on the RSRP of the first SSB, whether uplink synchronization of the first resource is invalid includes: When the RSRP of the first SSB is greater than or equal to a first threshold, the terminal device determines that uplink synchronization of the first resource is valid. When an increase variation of the RSRP of the first SSB is greater than or equal to a second threshold, or when a decrease variation of the RSRP of the first SSB is greater than or equal to a third threshold, the terminal device determines that uplink synchronization of the first resource is invalid.

With reference to the third aspect, in a possible implementation, the terminal device receives, via the distributed unit of the first network device, second indication information sent by the central unit of the first network device. The second indication information indicates a second resource of the configured grant of the terminal device, and the second resource is used by the terminal device to send data by using the second resource in the inactive state and the connected state.

With reference to the third aspect and/or the fourth aspect, in a possible implementation, the terminal device receives second indication information sent by the second network device. The second indication information indicates a second resource of the configured grant of the terminal device, and the second resource is used by the terminal device to send data by using the second resource in the inactive state and the connected state.

According to the foregoing method, in a switching process between the inactive state and the connected state, the terminal device can transmit small data by using the indicated second resource regardless of whether the terminal device is in the inactive state or the connected state. This avoids impact of the switching process on small data transmission, and a corresponding resource does not need to be reconfigured for the terminal device after the switching, thereby improving efficiency and performance of transmitting small data by the terminal device.

With reference to the third aspect and/or the fourth aspect, in a possible implementation, the terminal device is restored to the connected state by using a context of the terminal device that is obtained by the second network device, and the context of the terminal device is obtained by receiving by the second network device and is from the central unit of the first network device.

According to a fifth aspect, this application provides a communication method. A central unit of a first network device sends a context of a terminal device in an inactive state to a second network device. The central unit of the first network device sends a first message to the distributed unit of the first network device, where the first message indicates the distributed unit of the first network device to release the context of the terminal device.

According to the foregoing method, in a process in which the central unit of the first network device sends the context of the terminal device in the inactive state to the second network device, the first network device may determine that the terminal device is currently handed over to the second network device, to indicate the distributed unit of the first network device in time to release the context of the terminal device. In this way, the distributed unit of the first network device can release the context of the terminal device in time in a process of transmitting small data by the terminal device as the terminal device is handed over to the second network device. This improves utilization of a resource corresponding to the context of the terminal device by the distributed unit of the first network device, and improves overall network performance.

In a possible implementation, before the central unit of the first network device sends a context of the terminal device in the inactive state to a second network device, the method further includes: The central unit of the first network device receives a retrieve context request of the terminal device from the second network device.

According to the foregoing method, the first network device may determine, based on the retrieve context request of the terminal device that is sent by the second network device, that the second network device is a network device to which the terminal device is to be handed over. This helps the first network device manage the context of the terminal device, and reduces resource overheads while ensuring that the terminal device can successfully transmit small data in a handover process.

In a possible implementation, before the central unit of the first network device sends a context of the terminal device in the inactive state to a second network device, the method further includes: The central unit of the first network device successfully verifies an identity of the second network device.

According to the foregoing method, after successfully verifying the identity of the second network device, the central unit of the first network device indicates the distributed unit of the first network device to release the context of the terminal device. This reduces resource overheads when security of the second network device is ensured, that is, when the terminal device can be successfully handed over to the second network device, and avoids a problem that the terminal device may be frequently handed over to the network device.

In a possible implementation, the context includes one or more of the following:
 a configured grant configured for the terminal device;
 configuration information of a PDCCH configured for the terminal device;
 a temporary identifier for scrambling the PDCCH;
 an inactive radio network temporary identifier I-RNTI configured for the terminal device; and
 configuration information of an RLC layer corresponding to a radio bearer configured for the terminal device.

In a possible implementation, the terminal device in the inactive state is configured to transmit data to the first network device.

According to a sixth aspect, this application provides a communication apparatus, used in a first network device. The first network device may include a central unit and a distributed unit. The central unit may include a processing module, a sending module, and a receiving module.

In some embodiments, the processing module of the central unit is configured to send, by using the sending module of the central unit, first indication information to a terminal device through the distributed unit of the first network device. The first indication information indicates a first resource of a configured grant of the terminal device, and the first resource is associated with a first SSB. The first SSB is used by the terminal device to determine, in an inactive state, whether to send data by using the first resource.

In a possible implementation, the processing module of the central unit is configured to send a context of the terminal device in the inactive state to the second network device by using the sending module of the central unit. The processing module of the central unit is configured to send a first message to the distributed unit of the first network device by using the sending module of the central unit. The first message indicates the distributed unit of the first network device to release the context of the terminal device.

In a possible implementation, before sending the context of the terminal device in the inactive state to the second network device by using the sending module of the central unit, the processing module of the central unit is further configured to receive, by using the receiving module of the central unit, a retrieve context request of the terminal device from the second network device.

In a possible implementation, before sending the context of the terminal device in the inactive state to the second network device by using the sending module of the central unit, the processing module of the central unit is further configured to successfully verify an identity of the second network device.

In some other embodiments, the processing module of the central unit is configured to send a context of the terminal device in the inactive state to the second network device by using the sending module of the central unit. The processing module of the central unit is configured to send a first message to the distributed unit of the first network device by using the sending module of the central unit. The first message indicates the distributed unit of the first network device to release the context of the terminal device.

In a possible implementation, before the processing module of the central unit is configured to send the context of the terminal device in the inactive state to the second network device by using the sending module of the central unit, the processing module of the central unit is further configured to receive, by using the receiving module of the central unit, a retrieve context request of the terminal device from the second network device.

In a possible implementation, before the processing module of the central unit is configured to send the context of the terminal device in the inactive state to the second network device by using the sending module of the central unit, the processing module of the central unit is further configured to successfully verify an identity of the second network device.

In a possible implementation, the context includes one or more of the following: a configured grant configured for the terminal device; configuration information of a physical downlink control channel configured for the terminal device; a temporary identifier for scrambling the physical downlink control channel;
    an inactive radio network temporary identifier configured for the terminal device; and configuration information of a radio link control layer corresponding to a radio bearer configured for the terminal device.

In a possible implementation, the terminal device in the inactive state is configured to transmit data to the first network device.

According to a seventh aspect, this application provides a communication apparatus, used in a second network device. The second network device may include a processing module, a sending module, and a receiving module. The processing module is configured to send first indication information to a terminal device by using the sending module. The first indication information indicates a first resource of a configured grant of the terminal device, and the first resource is associated with a first SSB. The first SSB is used by the terminal device to determine, in an inactive state of the terminal device, whether to send data by using the first resource.

With reference to the sixth aspect or the seventh aspect, in a possible implementation, an RSRP of the first SSB is used to: determine whether uplink synchronization of the first resource is invalid; and when it is determined that uplink synchronization of the first resource is valid, determine to send data by using the first resource; or when it is determined that uplink synchronization of the first resource is invalid, determine to release the first resource.

With reference to the sixth aspect or the seventh aspect, in a possible implementation, when the RSRP of the first SSB is greater than or equal to a first threshold, it is determined that uplink synchronization of the first resource is valid. When an increase variation of the RSRP of the first SSB is greater than or equal to a second threshold, or when a decrease variation of the RSRP of the first SSB is greater than or equal to a third threshold, it is determined that uplink synchronization of the first resource is invalid.

With reference to the sixth aspect or the seventh aspect, in a possible implementation, the processing module of the central unit is configured to send, by using the sending module of the central unit, second indication information to the terminal device through the distributed unit of the first network device. The second indication information indicates a second resource of the configured grant of the terminal device, and the second resource is used by the terminal device to send data by using the second resource in the inactive state and a connected state.

With reference to the sixth aspect or the seventh aspect, in a possible implementation, the context includes one or more of the following:
    a configured grant configured for the terminal device;
    configuration information of a PDCCH configured for the terminal device;
    a temporary identifier for scrambling the PDCCH;
    an inactive radio network temporary identifier I-RNTI configured for the terminal device; and
    configuration information of an RLC layer corresponding to a radio bearer configured for the terminal device.

According to an eighth aspect, this application provides a communication apparatus, used in a terminal device or a chip of a terminal device. The communication apparatus may include a processing module, a receiving module, and a sending module.

In some embodiments, the processing module is configured to receive, by using the receiving module through a distributed unit of a first network device, first indication information sent by a central unit of the first network device. The first indication information indicates a first resource of a configured grant of the terminal device, and the first resource is associated with a first SSB. The processing module is configured to determine, in an inactive state based on the first SSB, whether to send data by using the first resource.

In some other embodiments, the processing module is configured to receive, by using the receiving module, first indication information sent by a second network device. The first indication information indicates a first resource of a configured grant of the terminal device, and the first resource is associated with a first SSB. The terminal device determines, in the inactive state based on the first SSB, whether to send data by using the first resource. It should be noted that the second network device may be a network device to which the terminal device is handed over from a first network device, or may be a network device before the terminal device is handed over from the first network device.

In a possible implementation, the processing module is configured to: determine, in the inactive state based on reference signal received power RSRP of the first SSB, whether uplink synchronization of the first resource is invalid; and when it is determined that uplink synchronization of the first resource is valid, determine to send data by using the first resource; or when it is determined that uplink synchronization of the first resource is invalid, determine not to send data by using the first resource.

In a possible implementation, the processing module is configured to: in the inactive state, release the first resource when it is determined that uplink synchronization of the first resource is invalid.

In a possible implementation, the processing module is configured to: in the inactive state, when the RSRP of the first SSB is greater than or equal to a first threshold, determine that uplink synchronization of the first resource is valid; or when an increase variation of the RSRP of the first SSB is greater than or equal to a second threshold, or when a decrease variation of the RSRP of the first SSB is greater than or equal to a third threshold, determine that uplink synchronization of the first resource is invalid.

In a possible implementation, the processing module is configured to receive, by using the receiving module through the distributed unit of the first network device, second indication information sent by the central unit of the first network device. The second indication information indicates a second resource of the configured grant of the terminal device, and the second resource of the configured grant is used by the terminal device to send data by using the second resource in the inactive state and a connected state.

In a possible implementation, the processing module is configured to receive, by using the receiving module, second indication information sent by the second network device. The second indication information indicates a second resource of the configured grant of the terminal device, and the second resource is used by the terminal device to send data by using the second resource in the inactive state and the connected state.

In a possible implementation, the processing module is configured to be restored to the connected state by using a context of the terminal device that is obtained by the second network device, and the context of the terminal device is obtained by receiving by the second network device and is from the central unit of the first network device.

According to a ninth aspect, an embodiment of this application provides a communication apparatus, including a processor and a memory. The memory is configured to store computer-executable instructions. When the apparatus runs, the processor executes the computer-executable instructions stored in the memory, to enable the apparatus to perform any method in the implementations of the first aspect or the fifth aspect.

According to a tenth aspect, an embodiment of this application provides a communication apparatus, including a processor and a memory. The memory is configured to store computer-executable instructions. When the apparatus runs, the processor executes the computer-executable instructions stored in the memory, to enable the apparatus to perform any method in the implementations of the second aspect.

According to an eleventh aspect, an embodiment of this application provides a communication apparatus, including a processor and a memory. The memory is configured to store computer-executable instructions. When the apparatus runs, the processor executes the computer-executable instructions stored in the memory, to enable the apparatus to perform any method in the implementations of the third aspect or the fourth aspect.

According to a twelfth aspect, an embodiment of this application further provides a computer-readable storage medium. The computer-readable storage medium stores instructions, and when the instructions are run on a computer, the computer is enabled to perform any method in the implementations of the first aspect to the fifth aspect.

According to a thirteenth aspect, an embodiment of this application further provides a computer program product. The computer product includes a computer program. When the computer program is run, any method in the implementations of the first aspect to the fifth aspect is performed.

According to a fourteenth aspect, an embodiment of this application further provides a chip system, including a processor, configured to perform any method in the implementations of the first aspect to the fifth aspect.

According to a fifteenth aspect, an embodiment of this application further provides a communication system, including the first network device according to the sixth aspect or the ninth aspect, or the second network device according to the seventh aspect or the tenth aspect, or the terminal device according to the eighth aspect or the eleventh aspect.

DESCRIPTION OF EMBODIMENTS

The following describes some terms in embodiments of this application, to facilitate understanding of a person skilled in the art.

The technical solutions in embodiments of this application may be applied to various communication systems, for example, a 5th generation mobile communication (5th Generation mobile communication technology, 5G) system (for example, new radio (NR)), a long term evolution (LTE) system, an LTE frequency division duplex (FDD) system, and an LTE time division duplex (TDD) system. This is not limited herein. System architectures and service scenarios described in embodiments of this application are intended to describe the technical solutions in embodiments of this application more clearly, and do not constitute a limitation on the technical solutions provided in embodiments of this application. A person of ordinary skill in the art may learn that, with evolution of network architectures and emergence of new service scenarios, the technical solutions provided in embodiments of this application are also applicable to similar technical problems, provided that a radio access network device in the communication system has a CU-DU split architecture or an architecture with a function equivalent to the CU-DU split architecture.

Figure 1:
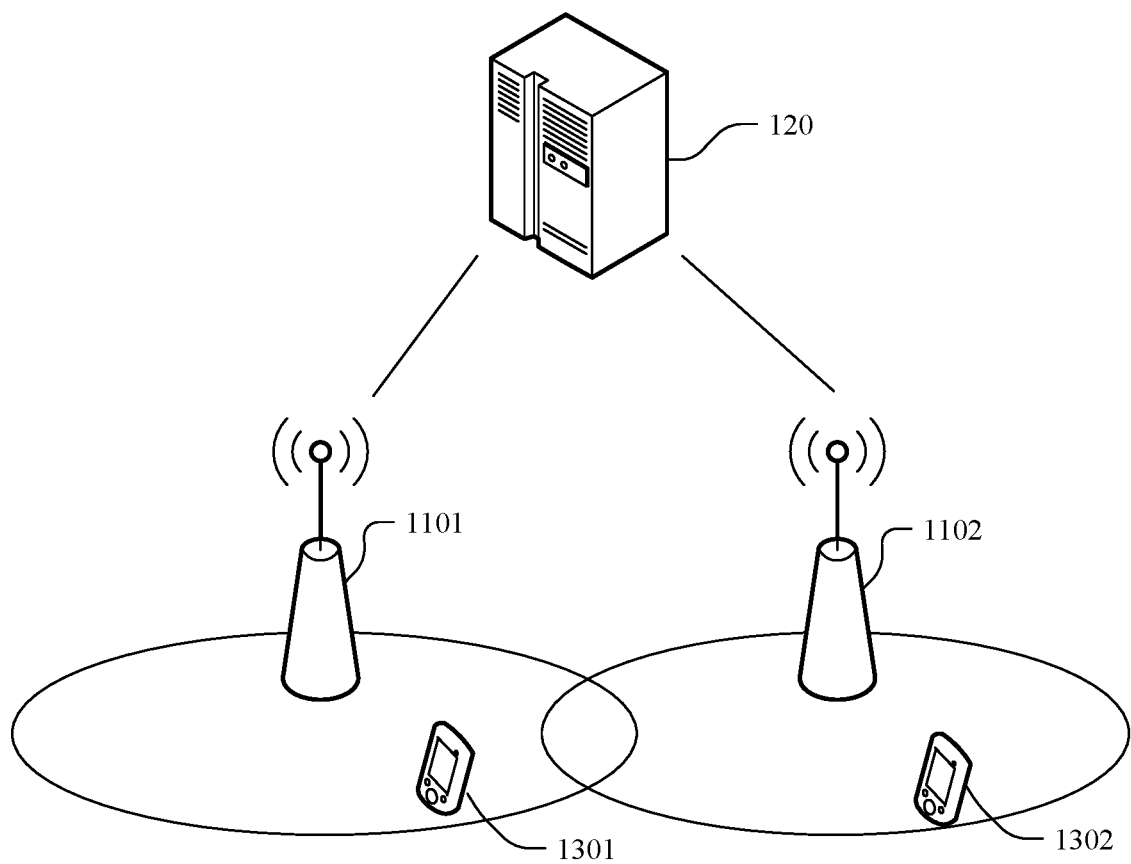
FIG. 1 and FIG. 2 each are a schematic diagram of a network architecture to which an embodiment of this application is applicable.

FIG. 1 is a schematic diagram of a network architecture of a communication system to which an embodiment of this application is applicable.

As shown in FIG. 1, the communication system includes terminal devices 1301 and 1302, and a network device.

The terminal device may access a wireless network, to access a service of an external network (for example, the internet) through the wireless network, or communicate with another device through the wireless network, for example, may communicate with another terminal device. An access network may be a next generation radio access network (NG-RAN). The access network may include an access network device, for example, a base station (for example, a gNB). The gNBs are connected through an interface (for example, an Xn interface). A RAN device is configured to connect the terminal device to the wireless network, and the gNB and a 5GC are connected through an interface (for example, an Ng interface). The RAN may include one or more access network devices, for example, an access network device 1101 and an access network device 1102.

The access network device is a node or a device that connects a terminal device to a radio network, and the access network device may also be referred to as a base station. The access network device includes, for example, but is not limited to, a next generation NodeB (gNB), an evolved NodeB (eNB), a radio network controller (RNC), a NodeB (NB), a base station controller (BSC), a base transceiver station (BTS), a home base station ((home evolved NodeB, HeNB) or (home NodeB, HNB)), a baseband unit (BBU), a transmission reception point (TRP), a transmission point (TP), or a mobile switching center in a 5G communication system.

A core network (CN) may include a plurality of core network devices. The core network device is configured to: manage the terminal device and provide a gateway for communicating with an external network. The CN may include one or more core network elements, for example, a core network element 120. When the network architecture shown in FIG. 1 is applicable to a 5G communication system, the core network may be a 5G core network (5GC). The 5GC includes one or more functions or devices. For example, the core network device may be an access and mobility management function (AMF) entity, a session management function (SMF) entity, a user plane function (UPF) entity, or the like, or a session management function (SMF). These functions or devices may be network elements in a hardware device, or may be software functions running on dedicated hardware, or may be virtualization functions instantiated on a platform (for example, a cloud platform). It may be understood that names of various core network devices are names in a 5G communication system. With evolution of the communication system, the names may be changed to other names with a same function. When the network architecture shown in FIG. 1 is applicable to an LTE communication system, the core network device may be a mobility management entity (MME), a serving gateway (S-GW), or the like.

The terminal device may also be referred to as user equipment (UE), a mobile station (MS), a mobile terminal (MT), or the like, and is a device that provides a user with voice or data connectivity, or may be an internet of things device. For example, the terminal device is a handheld device, a vehicle-mounted device, or the like that has a wireless connection function. Currently, the terminal device may be a mobile phone, a tablet computer, a notebook computer, a palmtop computer, a mobile internet device (MID), a wearable device (for example, a smartwatch, a smartband, or a pedometer), a vehicle-mounted device (for example, the vehicle-mounted device on an automobile, a bicycle, an electric vehicle, an aircraft, a ship, a train, or a high-speed train), a virtual reality (VR) device, an augmented reality (AR) device, a wireless terminal device in industrial control, a smart home device (for example, a refrigerator, a television, an air conditioner, or an electricity meter), an intelligent robot, a workshop device, a wireless terminal device in self driving, a wireless terminal device in remote medical surgery, a wireless terminal device in a smart grid, a wireless terminal device in transportation safety, a wireless terminal device in a smart city, a wireless terminal device in a smart home, a flight device (for example, an intelligent robot, a hot balloon, an unmanned aerial vehicle, or an aircraft), or the like. In embodiments of this application, UE or a terminal device is used as an example to describe the solutions.

It should be understood that quantities of devices in the communication system shown in FIG. 1 are merely used as an example. This embodiment of this application is not limited thereto. In an actual application, the communication system may further include more terminal devices and more RAN devices, and may further include another device. In embodiments of this application, an apparatus configured to implement a function of the access network device may be an access network device, or may be an apparatus that can support the access network device in implementing the function, for example, a chip system, or a combined component or device that can implement the function of the access network device. The apparatus may be installed in the access network device. In the technical solutions provided in embodiments of this application, the technical solutions provided in embodiments of this application are described by using an example in which the apparatus configured to implement the function of the access network device is the access network device.

Figure 2:
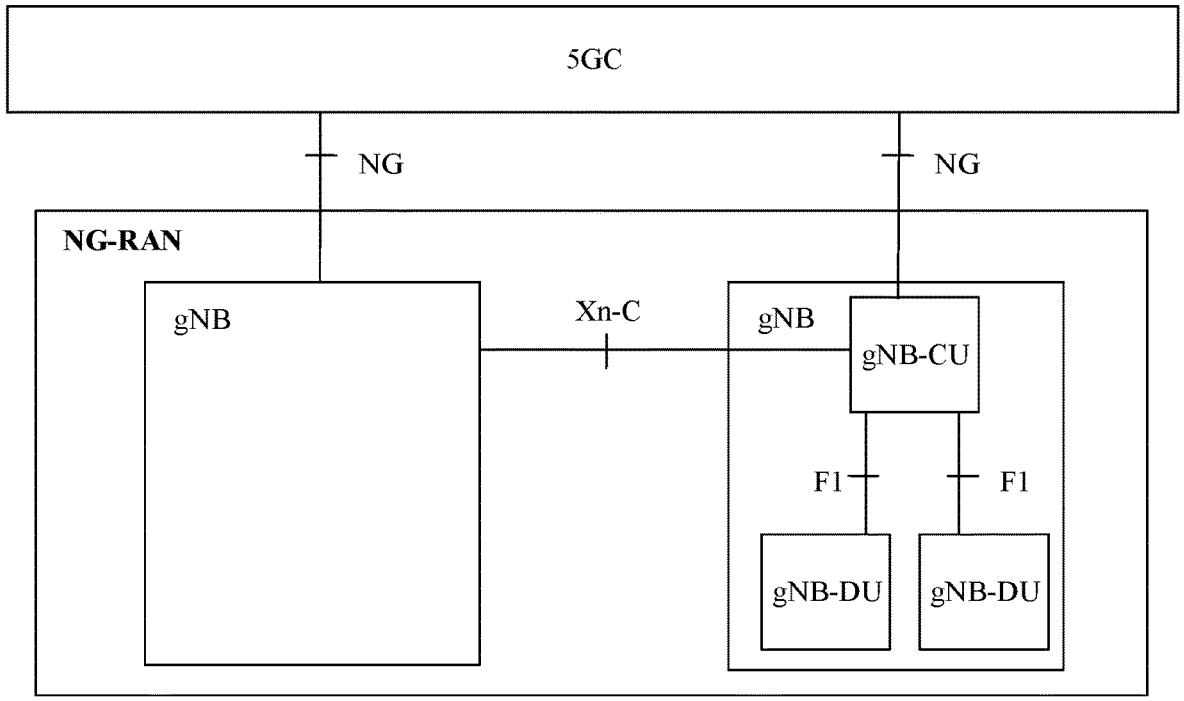

FIG. 2 is a schematic diagram of a network architecture in a 5G communication system to which an embodiment of this application is applicable. As shown in FIG. 2, the network architecture includes a CN device (for example, the 5GC shown in FIG. 2) and a RAN device.

In a new network architecture of a 5G NR network, a network device may include two logical network elements: a CU and a DU. Some functions of the network device are deployed on the CU, and remaining functions are deployed on the DU. A plurality of DUs may share one CU, to reduce costs and facilitate network expansion. The CU and the DU can be deployed in an integrated manner or deployed separately based on a scenario and a requirement. The network architecture is referred to as a CU-DU split architecture for short below.

In embodiments of this application, the CU and the DU are connected through an interface (for example, an F1 interface). The CU indicates that the base station is connected to a core network through an interface (for example, an Ng interface). In the communication system in this application, with reference to FIG. 2, UE may be connected to an access network device (for example, a gNB). Specifically, the UE may be connected to the DU in the gNB. The CU is connected to the 5GC and the DU. In a downlink communication link, the CU is configured to: receive data from the 5GC and send the data to the DU. In an uplink communication link, the CU is configured to: receive data from the DU and send the data to the 5GC. In addition, the CU has a centralized control function for the DU. In systems using different radio access technologies, devices having a CU function may have different names. For ease of description, the devices having the CU function are collectively referred to as an access network central unit.

The UE is connected to a CU and user equipment (UE). In a downlink communication link, the DU is configured to: receive data from the CU and send the data to the UE. In an uplink communication link, the DU is configured to: receive data from the UE and send the data to the CU. In systems using different radio access technologies, devices having a DU function may have different names. For ease of description, the devices having the DU function are collectively referred to as an access network distributed unit.

Figure 3A:
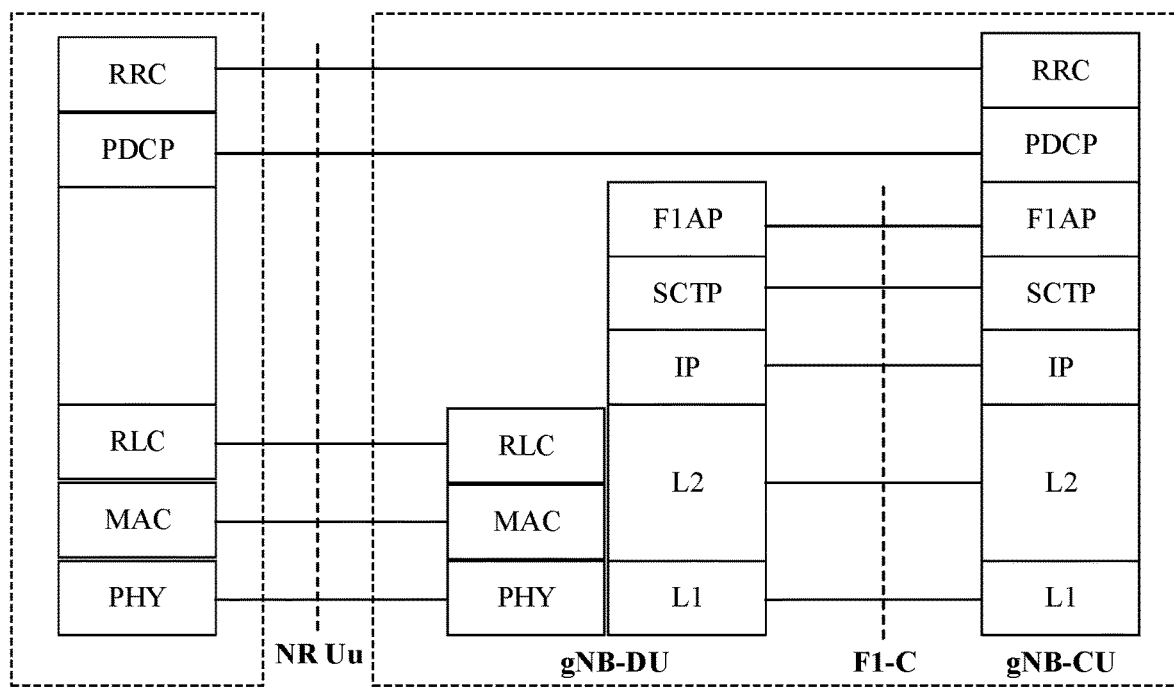
FIG. 3a is a schematic diagram of a protocol stack corresponding to a network architecture.

Communication between the RAN device and the terminal device complies with a specific protocol layer structure. For example, as shown in FIG. 3a, a control plane protocol layer structure may include functions of protocol layers such as a radio resource control (RRC) layer, a packet data convergence protocol (PDCP) layer, an RLC layer, a media access control (MAC) layer, and a physical layer. A user plane protocol layer structure may include the functions of the protocol layers such as the PDCP layer, the RLC layer, the MAC layer, and the physical layer. In a possible implementation, a service data adaptation protocol (SDAP) layer may be further included above the PDCP layer. A main function of the RRC layer is higher-layer control of the UE, and is related to access control, maintenance, and release of the UE, and UE configuration, so that the RRC layer can parse an RRC message. A main function of the MAC layer and the physical (PHY) layer is lower-layer scheduling of the UE, and is related to data packet assembly and data scheduling of the UE, so that the MAC layer can parse control signaling of the MAC layer, and the PHY layer can parse control signaling of the PHY layer. The RAN device may implement functions of protocol layers such as RRC, PDCP, RLC, and MAC by using one node or a plurality of nodes.

For a control plane, in a UL direction, a gNB-DU encapsulates the RRC message generated by the UE in an F1AP message of the F1 interface and sends the F1AP message to a gNB-CU. In a DL direction, the gNB-CU encapsulates the RRC message in the F1AP message and sends the F1AP message to the gNB-DU, and the gNB-DU extracts the RRC message from the F1AP message, maps the RRC message to an SRB corresponding to a Uu interface, and sends the RRC message to the UE.

For a user plane, in the UL direction, the gNB-DU maps a UE data packet received from a DRB of the Uu interface to a corresponding GTP tunnel and sends the UE data packet to the gNB-CU. In the DL direction, the gNB-CU maps the UE data packet to the corresponding GTP tunnel and sends the UE data packet to the gNB-DU, and the gNB-DU extracts the UE data packet from the GTP tunnel, maps the UE data packet to the DRB corresponding to the Uu interface, and sends the UE data packet to the UE.

In the foregoing network architecture, signaling generated by the CU may be sent to a terminal device by using DUs, or signaling generated by a terminal device may be sent to the CU by using the DUs. The DU may transparently transmit the signaling to the terminal device or the CU by directly encapsulating the signaling at a protocol layer without parsing the signaling. In the following embodiments, if transmission of such signaling between the DU and the terminal device is included, sending or receiving of the signaling by the DU includes this scenario. For example, signaling at the RRC or PDCP layer is finally processed as signaling at the physical layer and sent to the terminal device, or is converted from signaling received from the physical layer. In this architecture, the signaling of the RRC or the PDCP layer may also be considered to be sent by the DU, or sent by the DU and a radio frequency apparatus.

Figure 3B:
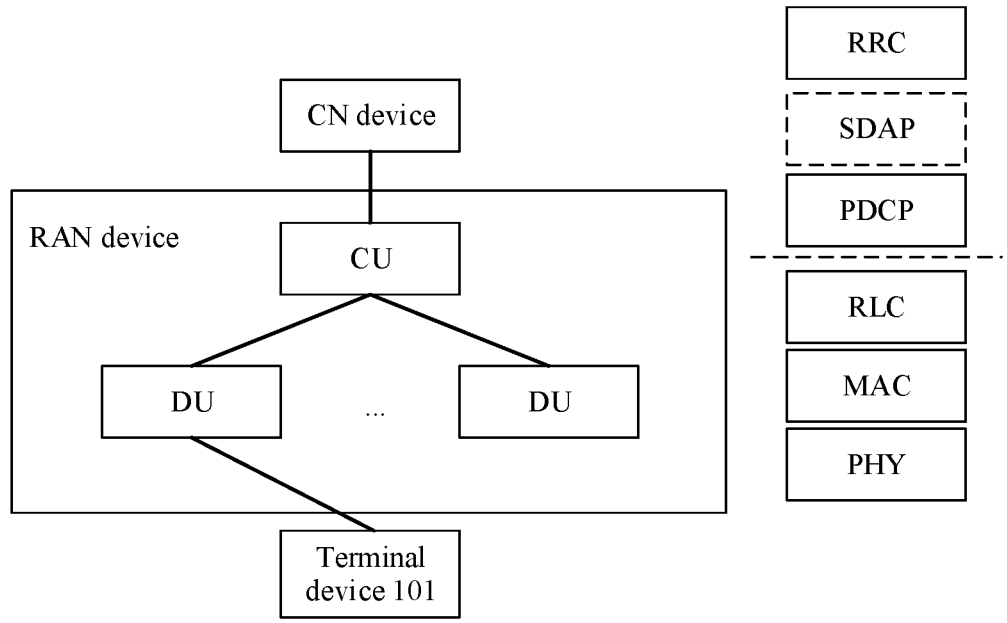
FIG. 3b is a schematic diagram of a network architecture to which an embodiment of this application is applicable.

Division between the CU of the network device and the DU of the network device based on a protocol stack may be shown in FIG. 3b. For example, the RRC layer, the SDAP layer, and the PDCP layer are deployed on the CU of the network device. The RLC layer, the MAC layer, and the physical layer are deployed on the DU of the network device.

In embodiments of this application, when the network device is a device that supports an NR system, function division of the CU and the DU may be performed based on a protocol stack. The CU of the network device and the DU of the network device are used as two function entities. In a possible manner, functions of the CU and the DU are distinguished based on real-time performance of processed content. As shown in FIG. 3b, the RRC layer, the SDAP layer, and the PDCP layer are deployed in the CU. The RLC layer, the MAC layer, the PHY layer, and the like are deployed in the DU. Correspondingly, the CU is capable of processing the RRC layer, the PDCP layer, and the SDAP layer. For the network device having a CU-DU architecture, the CU of the network device is responsible for managing an RRC state of the terminal device. The DU is capable of processing RLC, MAC, and the PHY.

It should be noted that the foregoing function division is merely an example, and there may be another division manner. For example, the CU is capable of processing the RRC layer, the PDCP layer, the RLC layer, and the SDAP layer, and the DU is capable of processing the MAC layer and the PHY layer. For another example, the CU is capable of processing the RRC, the PDCP, the RLC, the SDAP, and a part of the MAC (for example, adding a MAC header), and the DU is capable of processing the PHY and a part of the MAC (for example, scheduling).

Division based on the protocol layer is merely an example, and division may alternatively be performed based on another protocol layer such as the RLC layer. Functions of the RLC layer and a protocol layer above the RLC layer are set on the CU, and a function of a protocol layer below the RLC layer is set on the DU. Alternatively, division is performed at a protocol layer. For example, some functions of the RLC layer and a function of a protocol layer above the RLC layer are set on the CU, and a remaining function of the RLC layer and a function of a protocol layer below the RLC layer are set on the DU. In addition, division may alternatively be performed in another manner. For example, division is performed based on a latency. A function whose processing time needs to satisfy a latency requirement is set on the DU, and a function whose processing time does not need to satisfy the latency requirement is set on the CU. The foregoing described protocol layer division is merely an example, and division may be performed at another protocol layer. Examples are not described one by one herein.

Certainly, embodiments of this application may be further applicable to an LTE communication system. For example, the LTE communication system may also include a RAN device and a CN device. The RAN device (an eNB) includes a baseband apparatus and a radio frequency apparatus. The baseband apparatus may be implemented by one node, or may be implemented by a plurality of nodes. The radio frequency apparatus may be independently implemented remotely from the baseband apparatus, or may be integrated into the baseband apparatus, or a part of the radio frequency apparatus is implemented remotely from the baseband apparatus and a remaining part is integrated into the baseband apparatus. The radio frequency apparatus may be disposed remotely from the baseband apparatus. For example, a remote radio unit (RRU) is disposed remotely from a BBU. In addition, the radio frequency apparatus may not be disposed in the DU but is disposed remotely from the DU, or may be integrated into the DU, or a part of the radio frequency apparatus is disposed remotely from the DU and a remaining part is integrated into the DU. This is not limited herein.

It should be understood that a quantity and a type of UE included in the communication systems shown in FIG. 2 and FIG. 3b are merely examples, and embodiments of this application are not limited thereto. For example, more UEs that communicate with the access network device (for example, the gNB) may be included. For brevity, details are not described in the accompanying drawings. In addition, in the communication system shown in FIG. 2, although one base station and one UE connected to each DU are shown, the communication system may not be limited to including the base station and the UE connected to each DU. Details are not described herein again.

It should be understood that FIG. 1 to FIG. 3b merely show several functions or devices in embodiments of this application, and a communication system architecture may further include more or fewer functions or devices. For example, the 5GC device in FIG. 1 may further include unified data management (UDM), a data network (DN), or the like, and the DU shown in FIG. 2 may be further configured with more logical cells or the like.

Figure 4A:
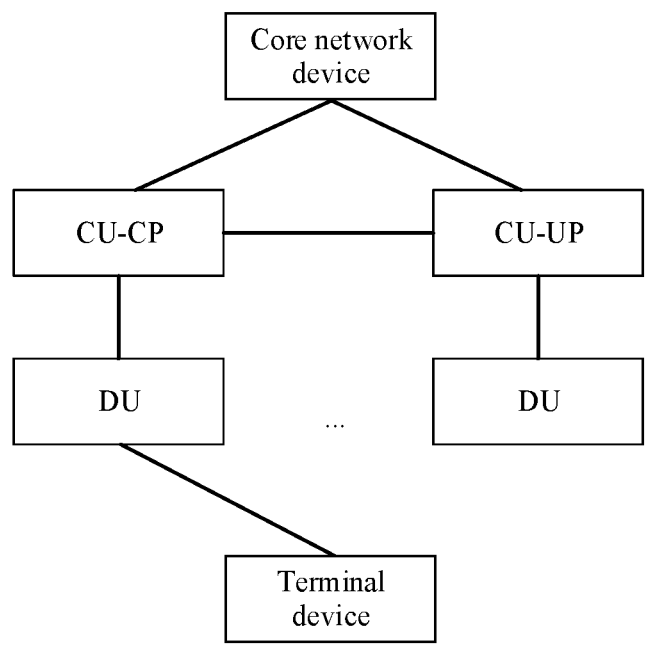
FIG. 4a is a schematic diagram of a network architecture to which an embodiment of this application is applicable.

Further, as shown in FIG. 4a, compared with the architecture shown in FIG. 3b, a CU of a network device may alternatively be in a form in which a control plane (CP) and a user plane (UP) are separated. In other words, the CU may be divided into two logical network elements: a CU-CP and a CU-UP. Currently, an interface between the CU and a DU in the LTE system is named as a W1 interface, and an interface between the CU and the DU in the NR system is named as an F1 interface. Functions of the two interfaces are similar. In FIG. 4a, an example in which the network device is a gNB in the NR system is used for description. The F1 interface includes the control plane (CP) and the user plane (UP). A transport layer protocol of the control plane is a stream control transmission protocol (SCTP), and a transmitted message is an F1 application layer protocol (F1AP) message. A transport layer protocol of the user plane is a general packet radio service (GPRS) tunneling protocol user plane (GTP-U).

An interface between the CU-CP and the CU-UP is named as E1, and is for transmitting signaling between the CU-CP and the CU-UP. An F1-C interface between the CU-CP and the DU is for transmitting F1 signaling between the CU-CP and the DU and RRC signaling of a terminal device. An F1-U interface between the CU-CP and the DU is for transmitting data radio bearer (DRB) data. After receiving uplink data carried on a DRB through an air interface of the DU, the DU processes the data at a physical layer, a MAC layer, and an RLC layer, and then sends the data of the DRB to the CU through the F1-U interface. After receiving an RRC message sent by the terminal device through the air interface, the DU processes the message at the physical layer, the MAC layer, and the RLC layer that are of the DU, and then sends the RRC message to the CU through the F1-CP interface.

For example, the functions of the CU may be implemented by one entity or different entities. For example, as shown in FIG. 2, the functions of the CU may be further divided, to be specific, a control plane and a user plane are split, and are implemented by using different entities: a control plane CU entity (namely, a CU-CP entity) and a user plane CU entity (namely, a CU-UP entity). The CU-CP entity and the CU-UP entity may be coupled to the DU, to jointly complete the function of the access network device. An interface between the CU-CP entity and the CU-UP entity may be an E1 interface, an interface between the CU-CP entity and the DU may be an F1-C interface, and an interface between the CU-UP entity and the DU may be an F1-U interface. One DU and one CU-UP may be connected to one CU-CP. Under control of a same CU-CP, one DU may be connected to a plurality of CU-UPs, and one CU-UP may be connected to a plurality of DUs.

It should be noted that the network architecture and the service scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of new service scenarios, the technical solutions provided in embodiments of this application are also applicable to similar technical problems.

As described above, when the CU-DU architecture is used in the network device, the CU includes the RRC layer, and is responsible for managing the RRC state of the terminal device. In a 5G network, three RRC states may be included: an RRC idle state (idle), an RRC inactive state (Inactive), and an RRC connected state (connected).

In the RRC connected state, there is a dedicated RRC connection between the terminal device and the access network device. The dedicated RRC connection is a DRB or SRB1 connection. In the RRC idle state, there is no dedicated RRC connection between the terminal device and the access network device.

The RRC inactive state is a new RRC state in 5G. UE in the RRC inactive state can have a low data transmission recovery delay because the UE in the RRC inactive state can be quickly switched to the RRC connected state in an RRC resume procedure without re-access. The terminal device stores the context of the terminal device, and a source network device (last serving gNB) stores the context of the terminal device and an NG connection to the AMF and the UPF. The dedicated RRC connection between the terminal device and the access network device is suspended, and may be resumed subsequently. In the RRC inactive state, the terminal device may not notify the access network device when moving in an RNA. When moving in a same RNA, the UE does not need to exchange information with the gNodeB. When moving out of the RNA, the UE needs to start an RNA update process.

In addition, the UE in the RRC inactive state suspends data processing, and the UE in the RRC inactive state may obtain a power consumption level close to that in the RRC idle state, so as to reduce power consumption of the terminal device. Similar to the RRC idle state, only content (paging and broadcast) in common search space can be received and cell reselection can be performed in the RRC inactive state, and a principle of cell reselection in the RRC inactive state is the same as that in the RRC idle state.

Figure 4B:
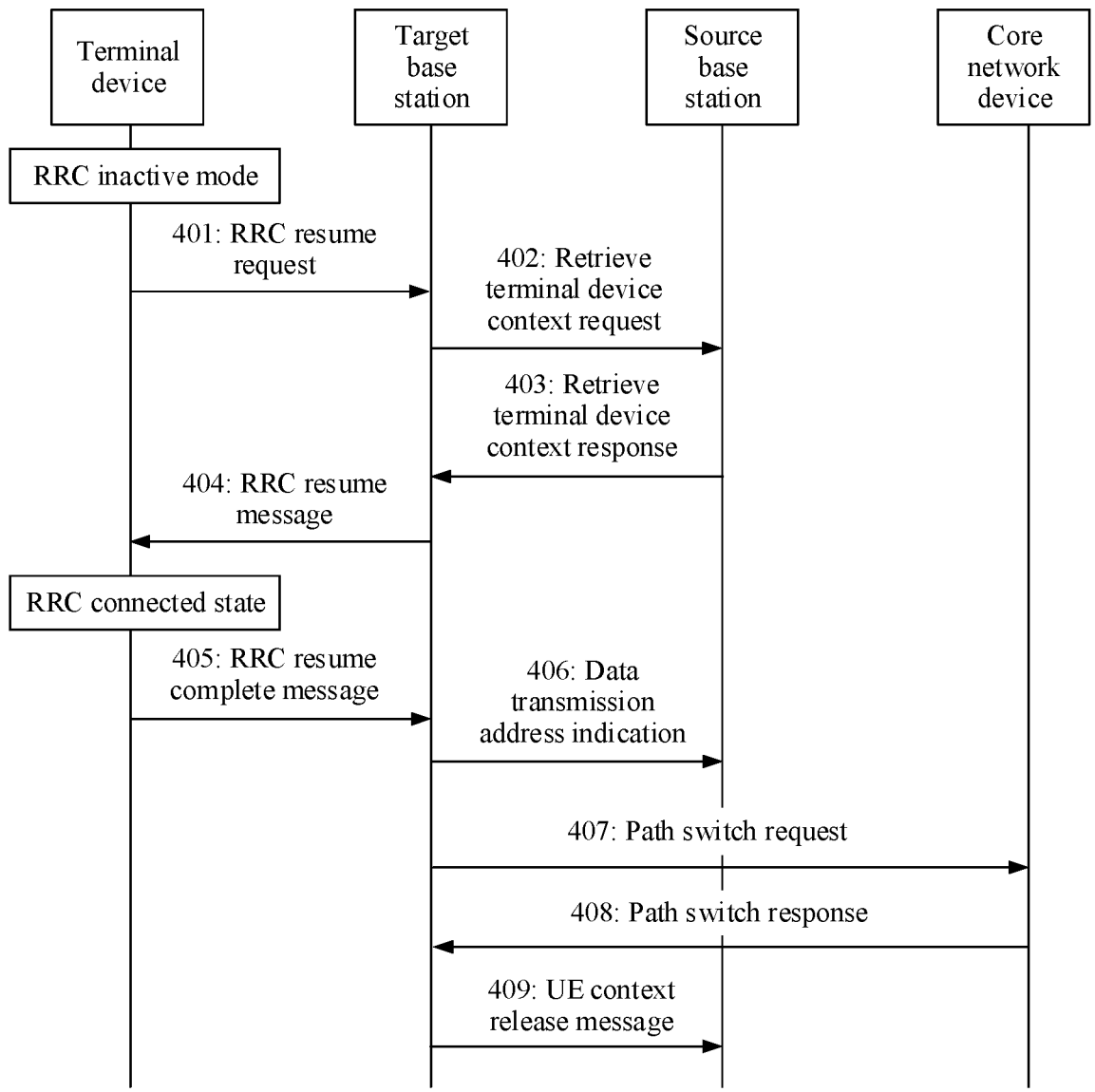
FIG. 4b is a schematic flowchart of a method in which a terminal device is restored from an RRC inactive state to an RRC connected state.

In the RRC inactive state, the terminal device may change from the RRC inactive state to the RRC connected state by requesting to resume the RRC connection. FIG. 4b is a schematic flowchart of an RRC connection resume method according to an embodiment of this application. A procedure of the method includes the following steps.

Step 401: A terminal device sends an RRC resume request to a target base station.

After moving out of coverage of a source base station and entering coverage of the target base station gNB, the terminal device may initiate an RRC resume procedure to the target base station. The RRC resume request may carry an I-RNTI, so that the target base station may request a context of the terminal device from the source base station.

Step 402: The target base station sends a retrieve terminal device context request (retrieve UE context request) to the source base station.

The retrieve terminal device context request includes the I-RNTI in the RRC resume request sent by the terminal. The source base station may determine the context of the terminal device based on the I-RNTI and a stored context of the terminal device.

Step 403: The source base station sends a retrieve terminal device context response (retrieve UE context response) to the target base station.

The retrieve terminal device context response may include the context of the terminal device.

Step 404: The target base station sends an RRC resume message (RRC resume) to the terminal device.

Correspondingly, after receiving the RRC resume message, the terminal device enters the RRC connected state, to resume the RRC connection.

Step 405: The terminal device sends an RRC connection resume complete message (RRC Resume complete) to the target base station.

Step 406: The target base station sends data forwarding address indication information (Xn-U address indication) to the source base station.

The data forwarding address indication information may indicate a tunnel address for data forwarding of the source base station. For example, the data forwarding address may be a tunnel address used to forward downlink data. In this case, the source base station may have downlink data of the terminal device, and may send the downlink data to the target base station, and then the target base station sends the downlink data to the terminal device.

Step 407: The source base station sends a path switch request to a core network.

The path switch request may be used to switch a data forwarding path between the core network and a base station. For example, a connection between the UPF and the source base station is switched to a connection between the UPF and the target base station, and subsequent downlink data may be directly sent to the target base station by using the UPF.

Step 408: The core network device sends a path switch response to the source base station.

Step 409: The core network device sends a context release message (context release) to the source base station, to indicate the source base station to release the context of the terminal device.

Compared with a signaling procedure for switching from the RRC idle state to the RRC connected state, namely, an initial access procedure of the UE, a random access procedure, an RRC connection setup procedure, and an initial context setup procedure are included. A signaling procedure from the RRC inactive state to the RRC connected state can reduce a large quantity of signaling interaction (for example, RRC reconfiguration and security mode configuration procedures are reduced over the Uu interface, and context setup and authentication procedures are reduced over the NG interface). An access delay smaller in the RRC inactive state than in the RRC idle state is obtained through reduction in the signaling interaction.

A context setup procedure of the terminal device is specifically described below. For details, refer to FIG. 5.

Step 501: The terminal device sends capability information to a CU of the network device.

The capability information indicates a capability of the terminal device. Further, optionally, the capability information indicates that the terminal device has a capability of transmitting data in an inactive state, and the capability indicates that the terminal device in the inactive state has a capability of transmitting uplink information on a configured grant or a scheduling grant. The uplink information includes but is not limited to uplink signaling and uplink data. The uplink signaling may be uplink RRC signaling or the like, and the uplink data may be uplink service data, for example, video data or audio data.

It should be noted that the scheduling grant is a resource allocated by the network device to the terminal device based on a resource request, where the resource request is sent by the terminal device. For example, the resource request may be a preamble in a random access process or an uplink scheduling request. The configured grant is a resource pre-configured by the network device, and is featured by one-time allocation and repeated use, where the terminal device does not need to send a resource request.

It should be noted that the terminal device has a plurality of capabilities, and the capability information may alternatively indicate another capability of the terminal device. This is not limited in embodiments of this application.

Step 502: The CU of the network device sends a UE context setup request message to the DU of the network device.

The UE context setup request message may be used to request to set up a context for the terminal device.

Optionally, the UE context setup request message may include the capability information.

Step 503: The DU of the network device sets up the context for the terminal device, and sends a UE context setup response message to the CU of the network device.

It should be noted that, in embodiments of this application, the context may include an air interface context and an F1 context.

The air interface context may include an RLC layer configuration, a MAC layer configuration, physical layer configuration information, an I-RNTI, a C-RNTI, or the like of the terminal device. The air interface context may alternatively include "a configured grant for data transmission in the inactive state", configuration information of a PDCCH for sending physical layer feedback information, or an RNTI for scrambling a PDCCH. The F1 context may include an F1AP ID, transport layer address information for F1 data transmission, or the like. Transmission of DRB data of the terminal device between the CU of the network device and the DU of the network device may also be referred to as F1 data transmission.

In embodiments of this application, the context set up by the DU of the network device for the terminal device may include one or more of the following items.

1. Configured grant configured for the terminal device: The configured grant may be used to indicate an uplink resource allocated to the terminal device, and the configured grant may include but is not limited to one or more of a frequency domain resource, a periodicity, a start location, and data demodulation reference information that are of a physical uplink shared channel (PUS CH).

Optionally, the configured grant may be configured for the terminal device in the inactive state, and the terminal device in the inactive state may send one or both of the uplink RRC signaling and the uplink data by using the configured grant.

Optionally, a time-frequency resource configured by the configured grant may be a time-frequency resource dedicated to the terminal device, namely, a time-frequency resource that is not shared with another terminal device. In this case, the DU of the network device may establish a mapping relationship between the configured grant and the context of the terminal device and a mapping relationship between the configured grant and a data transmission channel of the terminal device.

Optionally, a time-frequency resource configured by the configured grant may be a time-frequency resource that is shared by the terminal device and another terminal device. In this case, when determining that the terminal device enters the inactive state, the CU of the network device may send the inactive I-RNTI to the DU of the network device. The DU of the network device may set up a mapping relationship between the configured grant and an I-RNTI of the terminal device. The I-RNTI may be a unique identity of the terminal device in the inactive state in a radio network-based notification area (RAN-based notification area, RNA).

2. Configuration information of the PDCCH configured for the terminal device: The configuration information of the PDCCH may be used to send feedback information of uplink data, schedule PUSCH transmission, schedule physical downlink shared control channel (PDSCH) transmission, or the like.

The configuration information of the PDCCH includes but is not limited to resource location information, a periodicity, a start location, and the like that are of the PDCCH.

In embodiments of this application, the PDCCH may schedule sending of physical layer signaling, for example, at least one of acknowledgement (ACK) or negative acknowledgement (NACK) signaling, an uplink grant for initial transmission, and an uplink grant for retransmission. The PDCCH may further schedule sending of a PDSCH, and information carried on the PDSCH includes but is not limited to one or more of downlink RRC signaling, downlink data, and a timing advance command. The terminal device may perform uplink transmission and downlink transmission based on scheduling of the PDCCH.

3. Temporary identifier for scrambling the PDCCH: The temporary identifier is a 32-bit radio network temporary identifier (RNTI) for scrambling the PDCCH. For example, the temporary identifier may be a cell radio network temporary identifier (C-RNTI) of the terminal device.

4. Configuration information of an RLC layer corresponding to a radio bearer configured for the terminal device.

5. Configuration information of a MAC layer configured for the terminal device.

6. I-RNTI configured for the terminal device.

It should be noted that the foregoing is merely an example, and the context of the terminal device may further include other information. This is not limited in embodiments of this application, and examples are not described one by one herein.

For example, the UE context setup response message sent by the CU of the network device may include the context of the terminal device.

Figure 5:
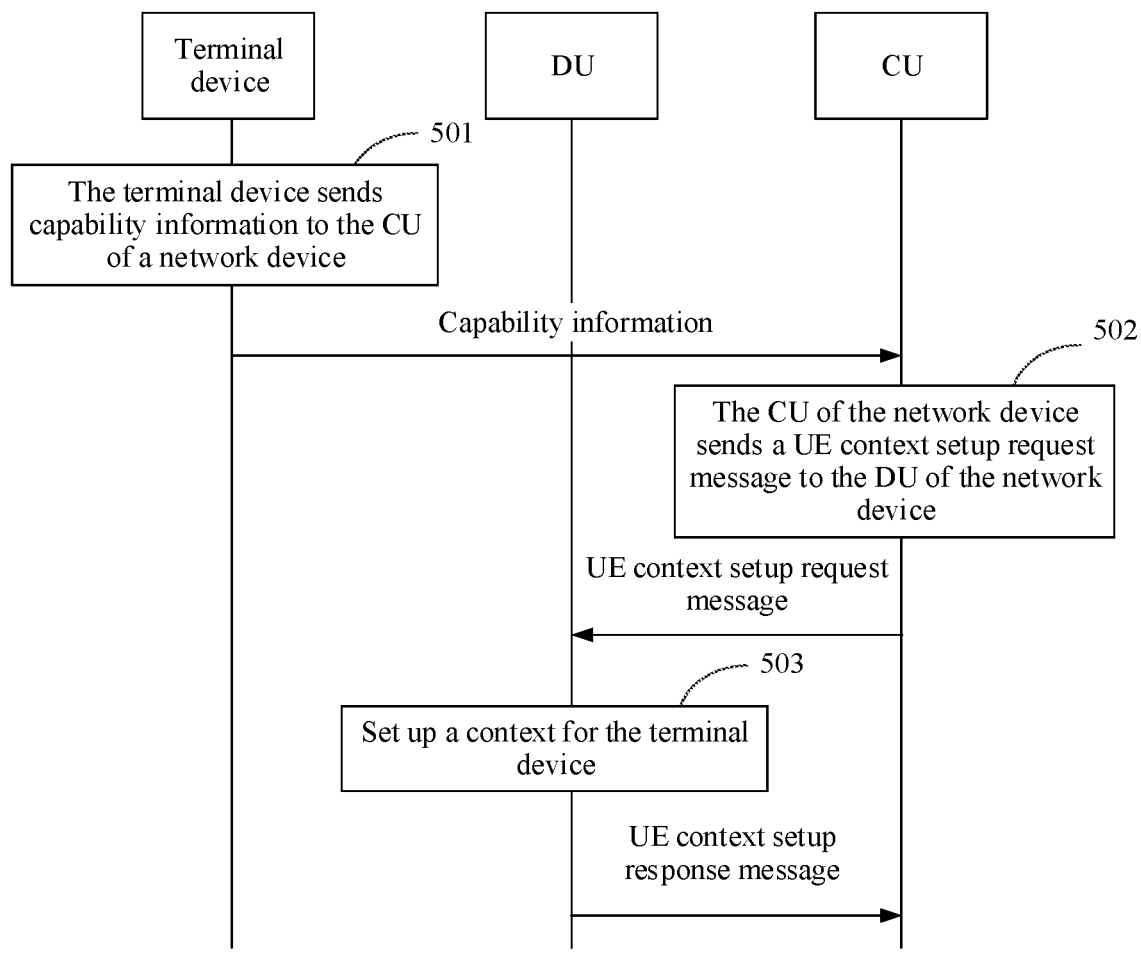
FIG. 5 is a schematic flowchart of a context setup method.

In the procedure shown in FIG. 5, only main steps are described. There may be another step in the process of setting up the context for the terminal device. Details are not described herein.

The context of the terminal device is set up in the procedure shown in FIG. 5.

Small data is transmitted in the RRC inactive state, and the RRC connected state does not need to be entered. This may avoid a case in which the UE needs to enter the RRC connected state when transmitting data. In a special scenario, for example, when the UE transmits small data, a data transmission amount is not large, but the data may need to be sent for a plurality of times inconsecutively. As a result, the UE needs to frequently switch between the RRC inactive state and the RRC connected state, and signaling is frequently sent. Therefore, in a possible implementation, the terminal device does not need to enter the RRC connected state when transmitting the small data in the RRC inactive state. This can reduce signaling overheads. The terminal in the RRC inactive state may transmit small data in an RA-SDT manner. In the CU-DU split scenario shown in FIG. 1, because the base station is divided into two parts: the CU and the DU, after the terminal moves out of the coverage of the source base station and enters the coverage of the target base station, how the DU of the network device determines whether to reserve the context of the terminal device needs to be considered in the RRC inactive state.

Figure 6:
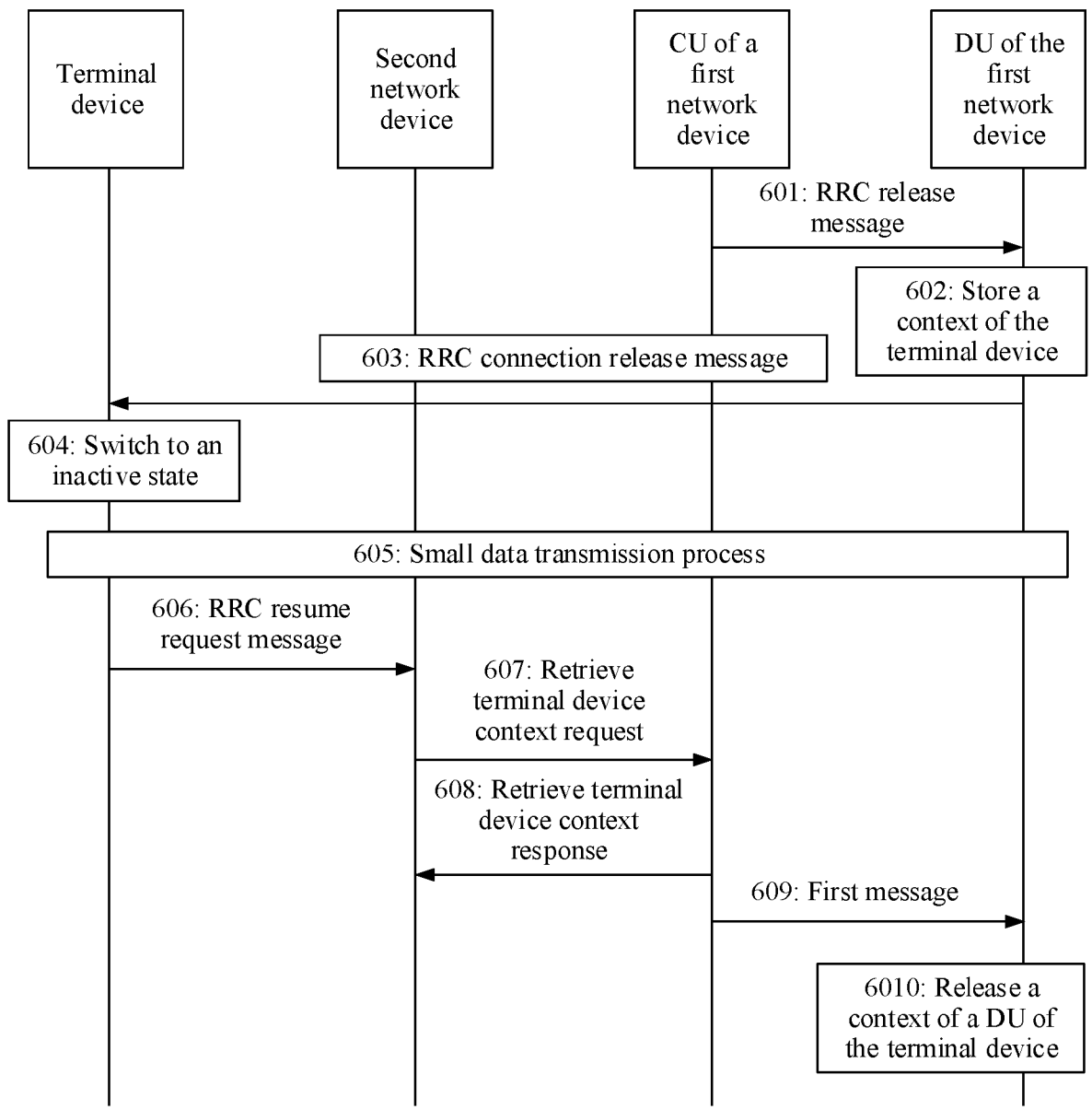
FIG. 6 is a schematic flowchart of a communication method according to an embodiment of this application.

As shown in FIG. 6, a communication method is provided in an embodiment of this application. The method includes the following steps.

Step 601: A CU of a first network device sends an RRC release message (RRC Release) to a DU of the first network device.

The first network device may be a source network device accessed by a terminal device in an RRC connected state. The CU of the first network device determines the RRC release message sent to the DU of the first network device when the terminal device is switched from the RRC connected state to an RRC inactive state. The RRC release message carries suspend configuration, and the configuration indicates the terminal device to be switched to the RRC inactive state. Optionally, the CU of the first network device sends, to the DU of the first network device, indication information for storing a context of the DU of the first network device.

Step 602: After receiving the RRC release message, the DU of the first network device stores a context of the terminal device.

For example, the context may be stored by the first network device after the first network device receives the indication information for storing the context of the DU, or may be a context stored by default by the DU of the first network device. For details, refer to the manner of setting up the context of the DU in FIG. 5. For example, the context of the DU of the first network device may include at least one of the following:

1. Small data transmission configured grant SDT-CG configuration: The small data configured grant CG configuration may include at least one of the following: indication information of a CG time domain resource, indication information of a CG frequency domain resource, and the like.

2. Small data transmission SDT-time alignment (time alignment, TA) configuration: a time alignment timer for small data transmission SDT-(TA timer, TAT).

3. SDT-RLC configuration. The configuration may include at least one of the following: SDT-RLC mode (AM or UM) indication information, RLC sequence number (SN) length indication information, and the like.

Step 603: The DU of the first network device sends the RRC connection release (RRC Release) message to the terminal device.

Step 604: The terminal device is switched from the RRC connected state to the RRC inactive state.

Step 605: When transmitting data, the terminal device triggers a small data transmission process. For a specific small data transmission process, refer to a transmission mode in the conventional technology. Details are not described herein again.

Step 606: The terminal device sends an RRC resume request message (RRC resume request) and uplink data (user data) to the second network device. The uplink data may be carried in NAS information (a NAS message).

For example, the first network device is a source network device, and the second network device is a target network device. In some scenarios, after moving out of coverage of a DU of the source network device and entering the coverage of the DU of the target network device, the terminal device may initiate an RRC resume procedure to the DU of the target network device. In this case, the DU of the source network device needs to be handed over to the DU of the target network device. The RRC resume request may carry the I-RNTI, so that a CU of the target network device may request the context of the terminal device from the CU of the source network device.

In some other scenarios, the terminal device may initiate the RRC resume procedure to the CU of the target network device or the DU of the target network device after moving out of the coverage of the CU of the source network device and entering the coverage of the CU of the target network device and the coverage of the DU of the target network device. In this case, the CU of the source network device needs to be handed over to the CU of the target network device, and the DU of the source network device needs to be handed over to the DU of the target network device. The RRC resume request may carry the I-RNTI, so that a CU of the target network device may request the context of the terminal device from the CU of the source network device. In this way, the DU of the target network device may obtain the context of the terminal by using the CU of the target network device.

Step 607: The second network device sends a retrieve UE context request to the CU of the first network device.

In a possible implementation, the retrieve UE context request may include identity verification information of the terminal device, and the CU of the first network device performs identity verification with reference to a security context in the CU of the first network device and the verification information in the retrieve UE context request.

Step 608: The CU of the first network device sends a retrieve UE context response to the target network device.

In some embodiments, the CU of the first network device may send the retrieve UE context response to the target network device after the identity verification of the CU of the first network device succeeds.

In a possible implementation, an anchor relocation manner is used as an example. The retrieve UE context response may include all contexts. For example, the retrieve UE context response may include SDAP configuration, RLC configuration, PDCP configuration, RB configuration, and the like.

In a possible implementation, a non-anchor relocation manner is used as an example. The retrieve UE context response may include a part of the context of the terminal device. For example, the retrieve UE context response may include the RLC configuration.

Step 609: The CU of the first network device sends a first message to the DU of the first network device.

The first message indicates the DU of the first network device to release the context of the terminal device.

In some embodiments, the CU of the first network device may send release indication information to the DU of the first network device after the identity verification succeeds. Certainly, the CU of the first network device may alternatively send the release indication information to the DU of the first network device after determining that the RRC connection between the DU of the target network device and the terminal device is set up.

Step 6010: The DU of the first network device releases a context of the DU of the terminal device.

The DU of the first network device may release the context of the DU of the terminal device after receiving the indication information.

According to the foregoing method, after determining that the terminal device initiates a resume process on the new base station, the CU of the source network device may determine that the terminal device does not return to the coverage of the DU of the source network device. Therefore, the CU of the source network device may send context release indication information to the DU of the source network device, so that the DU can allocate a resource to another terminal, thereby improving DU resource utilization.

Figure 7:
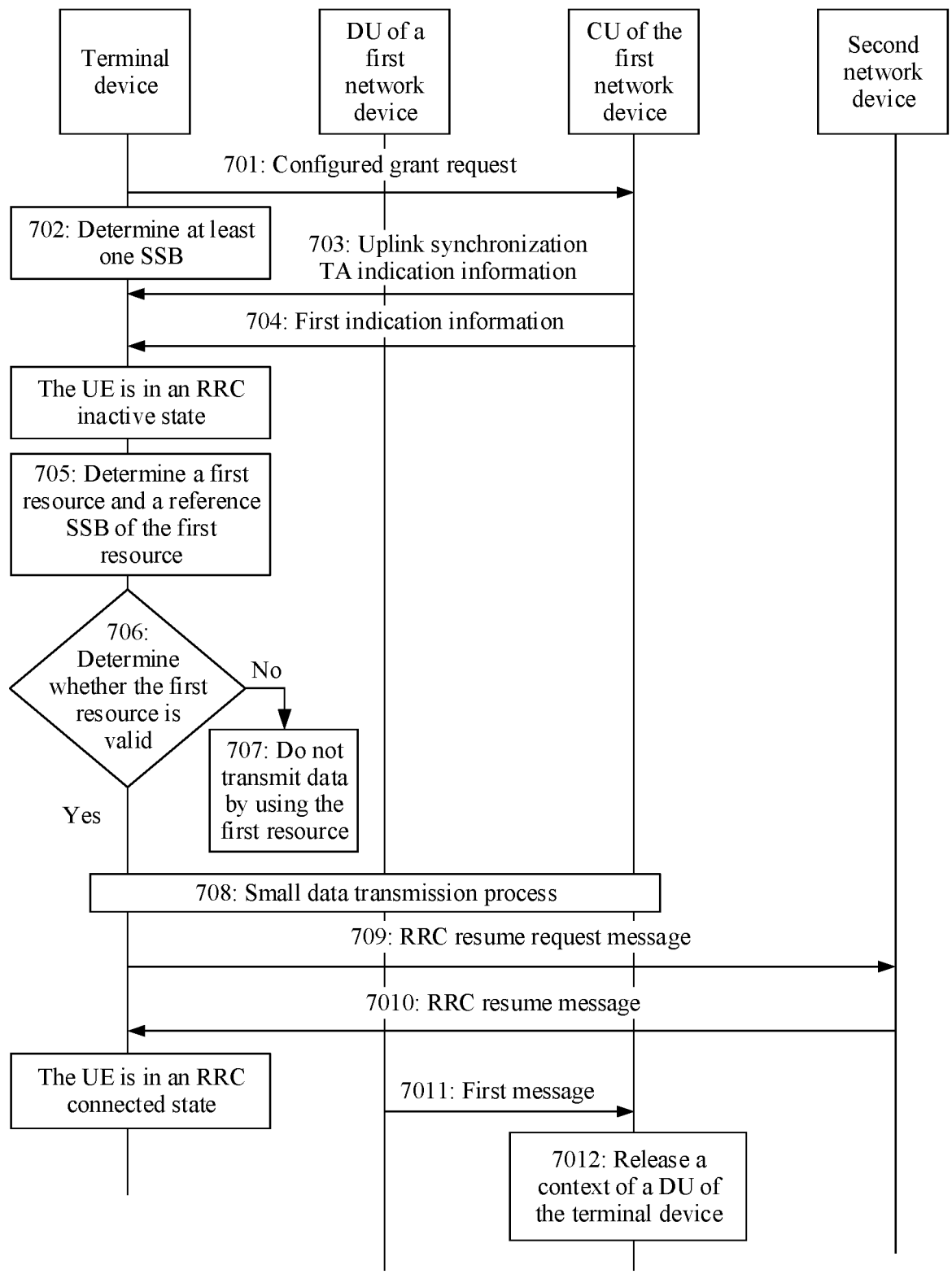
FIG. 7 is a schematic flowchart of a communication method according to an embodiment of this application.

With reference to the network architecture in FIG. 1, in a small data transmission scenario in an RRC inactive state, an embodiment of this application further provides a communication method. As shown in FIG. 7, the method includes the following steps.

Step 701: A terminal device sends a configured grant request to a first network device.

The configured grant request may request the first network device to configure a configured grant small data transmission resource of the terminal device. For example, the configured grant request may request TBS configuration to periodically configure a resource. The resource may be sent to the first network device when the terminal device sets up an RRC connection.

It should be noted that step 701 is optional, and the first network device may further configure the CG-SDT resource for the terminal in another manner.

Step 702: The terminal device determines at least one SSB.

In some embodiments, the terminal device may determine the at least one SSB.

For example, the terminal device may determine an SSB 1, where the SSB 1 is associated with the CG-SDT resource. The terminal device may further determine an SSB 2, where the SSB 2 has no association relationship with the CG-SDT resource.

Therefore, after the first network device configures the CG-SDT resource for the terminal device, the terminal may determine, based on the determined SSB associated with the CG-SDT resource, whether the CG-SDT resource can be used to transmit small data. In this way, a case in which the terminal device needs to separately indicate, to the terminal device, a CG-SDT resource used when the terminal device can use the CG-SDT resource to transmit small data is avoided.

Step 703: The first network device sends uplink synchronization indication information to the terminal device.

Correspondingly, the terminal device adjusts uplink synchronization based on the uplink synchronization indication information.

Step 704: The CU of the first network device sends first indication information to the terminal device by using the DU of the first network device.

The first indication information indicates a first resource of a configured grant of the terminal device, and the first resource is associated with a first SSB. The first SSB is used by the terminal device to determine, in an inactive state, whether to send data by using the first resource. In some embodiments, the first indication information may be carried in an RRC release message. Correspondingly, after receiving the first indication information, the terminal device may determine that the configured grant resource used to transmit small data is the first resource.

After obtaining the first indication information, the terminal device may enter the RRC inactive state, to reduce power consumption.

Step 705: The terminal determines, based on the first resource and an association relationship between the SSB and the CG-SDT resource, that the first SSB is a reference SSB of the first resource.

The reference SSB of the first resource is used to determine whether uplink synchronization of the first resource is valid. For example, when it is determined that uplink synchronization of the first resource is valid, it is determined to send data by using the first resource; or when it is determined that uplink synchronization of the first resource is invalid, it is determined to release the first resource.

In some embodiments, when the RSRP of the first SSB is greater than or equal to a first threshold, it is determined that uplink synchronization of the first resource is valid.

For example, when the RSRP of the first SSB is greater than or equal to the first threshold, the first SSB is determined as the reference SSB of the first resource. It should be noted that, even if an RSRP of the SSB 2 is greater than or equal to the first threshold, it is considered that the SSB 2 is not an SSB associated with the first resource, the SSB 2 cannot be used as the reference SSB of the first resource.

Step 706: The terminal device determines, based on the reference SSB, whether uplink synchronization of the first resource is valid. If uplink synchronization of the first resource is valid, step 707 is performed; or if uplink synchronization of the first resource is invalid, step 708 is performed.

In some embodiments, the terminal device may determine that uplink synchronization of the first resource is invalid when an increase variation of the RSRP of the first SSB is greater than or equal to a second threshold, or when a decrease variation of the RSRP of the first SSB is greater than or equal to a third threshold. For example, the second threshold or the third threshold is configured by the network device, and is sent to the terminal device in the RRC release message.

Step 707: The terminal device does not transmit (or send) data to the first network device by using the first resource.

Optionally, after determining that TA is invalid, the terminal device may release the first resource.

Step 708: The terminal device performs a small data transmission process. Specifically, the terminal device transmits (or sends) data to the first network device by using the first resource.

For example, the data sent by the terminal device to the first network device by using the first resource may be user data, or may be service data or the like. This is not limited herein.

Step 709: When the terminal device determines to be handed over to a second network device, the terminal device sends an RRC resume request message (resume request) to the second network device.

Step 7010: The second network device sends an RRC resume message to the terminal device.

Optionally, the RRC resume message includes second indication information. The second indication information indicates a second resource of the configured grant of the terminal device, and the second resource is used by the terminal device to send data by using the second resource in the inactive state and a connected state. In other words, the second resource may be used in the RRC connected state of the terminal device.

Correspondingly, the terminal device receives the RRC resume message sent by the network device. In some embodiments, the second resource may be the same as the first resource. In this case, after receiving the RRC resume message, the terminal device enters the RRC connected state, and sends second data to the second network device by using the second resource. Alternatively, the second resource may be different from the first resource. In this case, the terminal device may determine, based on a manner of determining whether uplink synchronization of the first resource is valid, whether uplink synchronization of the second resource is valid. When determining that uplink synchronization of the second resource is valid, the terminal device may send data to the second network device by using the second resource.

Optionally, step 7011: The CU of the first network device sends a first message to the DU of the first network device.

Before sending the first message to the DU of the first network device, the CU of the first network device may further perform step 607 and step 608. Details are not described herein again.

Step 7012: The DU of the first network device releases a context of the DU of the terminal device.

Figure 8:
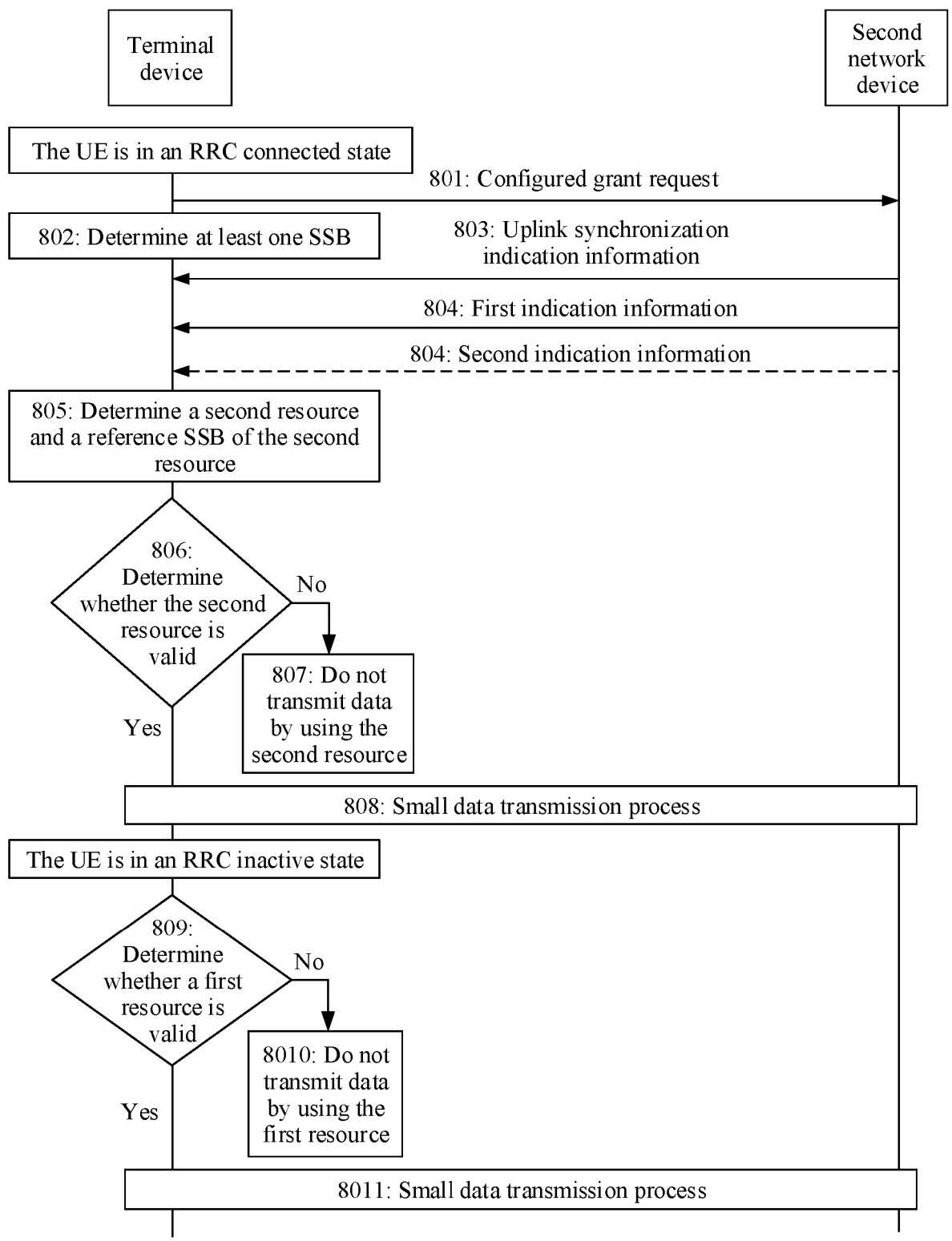
FIG. 8 is a schematic flowchart of a communication method according to an embodiment of this application.

With reference to the network architecture in FIG. 1 and the implementation in FIG. 6, after the terminal device is handed over to the second network device, the terminal device enters the RRC connected state, and the terminal device may re-enter the RRC inactive state. In a small data transmission scenario in which the terminal device is switched from the RRC connected state to the RRC inactive state, an embodiment of this application further provides a communication method. As shown in FIG. 8, the method includes the following steps.

Step 801: A terminal device sends a configured grant request to a second network device.

The configured grant request may request the second network device to determine a configured grant small data transmission resource, and the resource may be used by the terminal device to transmit small data in an RRC connected state.

In some embodiments, the configured grant request sent by the terminal device to the second network device may further request the second network device to determine a second resource. The second resource is used by the terminal device to send data by using the second resource in the inactive state and the connected state. Optionally, the second resource is associated with a second SSB, and the second SSB is used by the terminal device to determine, in the inactive state and the RRC connected state, whether to send data by using the second resource.

In some other embodiments, the terminal device may further request, in advance, the configured grant small data transmission resource in the RRC inactive state. For details, refer to the foregoing manner in which the terminal device obtains the first resource. Details are not described herein again.

It should be noted that the first resource may be the same as or different from the second resource. This is not limited herein. In addition, step 801 is optional, and the second network device may further configure a CG-SDT resource for the terminal in another manner.

Step 802: The terminal device determines at least one SSB.

In some embodiments, the terminal device may determine the at least one SSB.

For example, the terminal device may determine an SSB 1 and an SSB 3, where the SSB 1 is associated with the first resource, and the SSB 3 is associated with the second resource. The terminal device may further determine an SSB 2, where the SSB 2 has no association relationship with the CG-SDT resource.

Therefore, after the first network device configures the CG-SDT resource for the terminal device, the terminal may determine, based on the determined SSB associated with the CG-SDT resource, whether the CG-SDT resource can be used to transmit small data. In this way, a case in which the terminal device needs to separately indicate, to the terminal device, a CG-SDT resource used when the terminal device can use the CG-SDT resource to transmit small data is avoided.

Step 803: The second network device sends uplink synchronization indication information to the terminal device.

Correspondingly, the terminal device adjusts TA based on the uplink synchronization indication information.

Step 804: A CU of the second network device sends first indication information to the terminal device by using a DU of the second network device.

The first indication information indicates a first resource of a configured grant of the terminal device, and the first resource is associated with a first SSB. The first SSB is used by the terminal device to determine, in an inactive state, whether to send data by using the first resource. Correspondingly, after receiving the first indication information, the terminal device may determine that the configured grant resource used to transmit small data is the first resource.

Optionally, the CU of the second network device sends second indication information to the terminal device by using the DU of the second network device.

The second indication information indicates a second resource of the configured grant of the terminal device. The second resource is associated with a second SSB, and the second SSB is used by the terminal device to determine, in the connected state, whether to send data by using the second resource. Alternatively, the second SSB is used by the terminal device to determine, in the connected state and the inactive state, whether to send data by using the second resource.

Step 805: The terminal device determines, based on the second resource and an association relationship between the SSB and the CG-SDT resource, that the second SSB is a reference SSB of the second resource.

The reference SSB of the second resource is used to determine whether uplink synchronization of the second resource is valid. For example, when it is determined that uplink synchronization of the second resource is valid, it is determined to send data by using the second resource; or when it is determined that uplink synchronization of the second resource is invalid, it is determined to release the second resource.

In some embodiments, when the RSRP of the second SSB is greater than or equal to a first threshold, it is determined that uplink synchronization of the second resource is valid.

For example, when the RSRP of the second SSB is greater than or equal to the first threshold, the second SSB is determined as the reference SSB of the second resource. It should be noted that, even if an RSRP of the SSB 2 is greater than or equal to the first threshold, it is considered that the SSB 2 is not an SSB associated with the second resource, the SSB 2 cannot be used as the reference SSB of the second resource.

Optionally, the terminal device may determine, based on the first resource and the association relationship between the SSB and the CG-SDT resource, that the first SSB is the reference SSB of the first resource.

The reference SSB of the first resource is used to determine whether uplink synchronization of the first resource is valid. For example, when it is determined that uplink synchronization of the first resource is valid, it is determined to send data by using the first resource; or when it is determined that uplink synchronization of the first resource is invalid, it is determined to release the first resource.

In some embodiments, when the RSRP of the first SSB is greater than or equal to a first threshold, it is determined that uplink synchronization of the first resource is valid.

For example, when the RSRP of the first SSB is greater than or equal to the first threshold, the first SSB is determined as the reference SSB. It should be noted that, even if an RSRP of the second SSB is greater than or equal to the first threshold, it is considered that the second SSB is not an SSB associated with the first resource, the second SSB cannot be used as the reference SSB of the first resource.

Step 806: The terminal device determines, based on the reference SSB of the second resource, whether uplink synchronization of the second resource is valid. If uplink synchronization of the second resource is valid, step 808 is performed; or if uplink synchronization of the second resource is invalid, step 807 is performed.

In some embodiments, the terminal device may determine that uplink synchronization of the second resource is invalid when an increase variation of the RSRP of the second SSB is greater than or equal to a second threshold, or when a decrease variation of the RSRP of the second SSB is greater than or equal to a third threshold. For example, the second threshold or the third threshold is configured by the network device, and is sent to the terminal device in the RRC release message.

Step 807: The terminal device does not send data to the second network device by using the second resource.

Optionally, the terminal device determines that TA is invalid, and the terminal device may release the second resource.

Step 808: The terminal device performs a small data transmission process. Specifically, the terminal device sends user data to the second network device by using the second resource.

Step 809: After determining to enter the RRC inactive state, the terminal device determines, based on the reference SSB of the first resource, whether uplink synchronization of the first resource is valid. If uplink synchronization of the first resource is valid, step 8011 is performed; or if uplink synchronization of the first resource is invalid, step 8010 is performed.

For a manner in which the terminal device determines to enter the RRC inactive state, refer to step 401 to step 404. Details are not described herein again.

In some embodiments, the terminal device may determine that uplink synchronization of the first resource is invalid when an increase variation of the RSRP of the first SSB is greater than or equal to a second threshold, or when a decrease variation of the RSRP of the first SSB is greater than or equal to a third threshold. For example, the second threshold or the third threshold is configured by the network device, and is sent to the terminal device in the RRC release message.

Step 8010: The terminal device does not send data to the second network device by using the first resource.

Optionally, the terminal device determines that TA is invalid, and the terminal device may release the second resource.

Step 8011: The terminal device performs the small data transmission process. Specifically, the terminal device sends the user data to the second network device by using the first resource.

Based on a condition that it is determined that TA is valid, an SSB associated with the configured grant resource is used as the reference SSB, so that the terminal device learns whether TA is valid, to determine whether the configured grant resource indicated by the network device can be used. In addition, in a process of initiating small data transmission for a configured grant, the configured grant request initiated by the terminal may further request to configure the CG-SDT resource used in the RRC connected state, so that when the terminal device is in the inactive state and after the terminal device is switched to the RRC connected state, the terminal device may continue to use the configured CG-SDT resource. Therefore, the CG-SDT resource does not need to be reconfigured after the switching, and small data transmission is performed more efficiently, regardless of whether during the switching or after the switching, small data can be transmitted smoothly.

Figure 9:
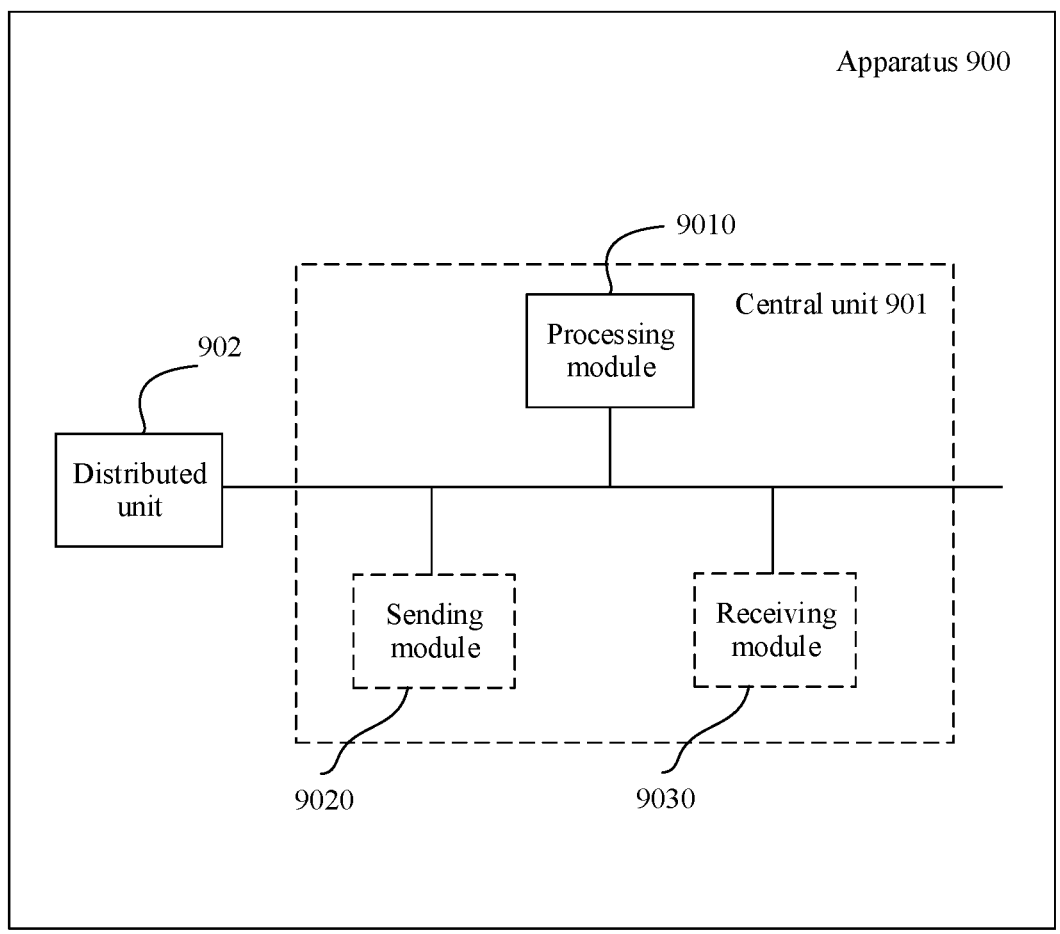
FIG. 9 is a schematic diagram of a communication apparatus according to an embodiment of this application.

FIG. 9 is a schematic diagram of a communication apparatus according to an embodiment of this application. The apparatus is configured to implement steps performed by the corresponding first network device in the foregoing method embodiments. As shown in FIG. 9, the apparatus 900 includes a central unit 901 and a distributed unit 902. The central unit 901 may include a processing module 9010. Optionally, the central unit 901 further includes a sending module 9020 and a receiving module 9030.

In some embodiments, the processing module 9010 is configured to send, by using the sending module 9020, first indication information to a terminal device through the distributed unit 902 of the first network device. The first indication information indicates a first resource of a configured grant of the terminal device, and the first resource is associated with a first SSB. The first SSB is used by the terminal device to determine, in an inactive state, whether to send data by using the first resource.

In a possible implementation, the processing module 9010 is configured to send a context of the terminal device in the inactive state to a second network device by using the sending module 9020. The processing module 9010 is configured to send a first message to the distributed unit 902 of the first network device by using the sending module 9020. The first message indicates the distributed unit 902 of the first network device to release the context of the terminal device.

In a possible implementation, before the processing module 9010 is configured to send the context of the terminal device in the inactive state to the second network device by using the sending module 9020, the processing module 9010 is further configured to receive, by using the receiving module 9030, a retrieve context request of the terminal device from the second network device.

In a possible implementation, before the processing module 9010 is configured to send the context of the terminal device in the inactive state to the second network device by using the sending module 9020, the processing module 9010 is further configured to successfully verify an identity of the second network device.

In a possible implementation, the processing module 9010 is configured to send, by using the sending module 9020, second indication information to the terminal device through the distributed unit of the first network device. The second indication information indicates a second resource of the configured grant of the terminal device, and the second resource is used by the terminal device to send data by using the second resource in the inactive state and a connected state.

In some other embodiments, the processing module 9010 of the central unit is configured to send the context of the terminal device in the inactive state to the second network device by using the sending module 9020 of the central unit. The processing module 9010 of the central unit is configured to send the first message to the distributed unit of the first network device by using the sending module 9020 of the central unit. The first message indicates the distributed unit 902 of the first network device to release the context of the terminal device.

In a possible implementation, before the processing module 9010 of the central unit is configured to send the context of the terminal device in the inactive state to the second network device by using the sending module 9020 of the central unit, and is further configured to receive, by using the receiving module 9030 of the central unit, the retrieve context request of the terminal device from the second network device.

In a possible implementation, before the processing module 9010 of the central unit is configured to send the context of the terminal device in the inactive state to the second network device by using the sending module 9020 of the central unit, the processing module of the central unit is further configured to successfully verify the identity of the second network device.

In a possible implementation, the context includes one or more of the following: a configured grant configured for the terminal device; configuration information of a physical downlink control channel configured for the terminal device; a temporary identifier for scrambling the physical downlink control channel; an inactive radio network temporary identifier configured for the terminal device; and configuration information of a radio link control layer corresponding to a radio bearer configured for the terminal device.

In a possible implementation, the terminal device in the inactive state is configured to transmit data to the communication apparatus 900.

Figure 10:
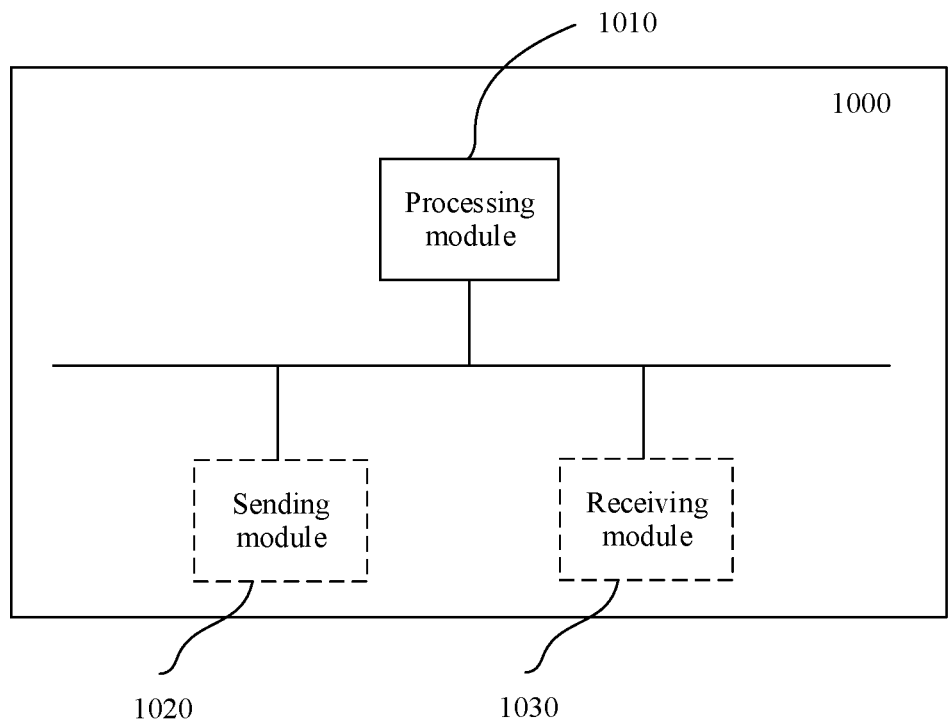
FIG. 10 is a schematic diagram of a communication apparatus according to an embodiment of this application.

FIG. 10 is a schematic diagram of a communication apparatus according to an embodiment of this application. The apparatus is configured to implement steps performed by the corresponding second network device or terminal device in the foregoing method embodiments. As shown in FIG. 10, the apparatus 1000 includes a processing module 1010. Optionally, the apparatus 1000 further includes a sending module 1020 and a receiving module 1030.

In some embodiments, an example in which the communication apparatus in FIG. 10 is a second network device is used. The processing module 1010 is configured to send first indication information to a terminal device by using the sending module 1020. The first indication information indicates a first resource of a configured grant of the terminal device, and the first resource is associated with a first SSB. The first SSB is used by the terminal device to determine, in an inactive state, whether to send data by using the first resource.

With reference to the embodiments in FIG. 9 and FIG. 10, in a possible implementation, an RSRP of the first SSB is used to: determine whether uplink synchronization of the first resource is invalid; and when it is determined that uplink synchronization of the first resource is valid, determine to send data by using the first resource; or when it is determined that uplink synchronization of the first resource is invalid, determine to release the first resource.

With reference to the embodiments in FIG. 9 and FIG. 10, in a possible implementation, when the RSRP of the first SSB is greater than or equal to a first threshold, it is determined that uplink synchronization of the first resource is valid. When an increase variation of the RSRP of the first SSB is greater than or equal to a second threshold, or when a decrease variation of the RSRP of the first SSB is greater than or equal to a third threshold, it is determined that uplink synchronization of the first resource is invalid.

With reference to the embodiments in FIG. 9 and FIG. 10, in a possible implementation, the context includes one or more of the following: a configured grant configured for the terminal device; configuration information of a PDCCH configured for the terminal device; a temporary identifier for scrambling the PDCCH; an inactive I-RNTI configured for the terminal device; and configuration information of an RLC layer corresponding to a radio bearer configured for the terminal device.

In some other embodiments, an example in which the communication apparatus in FIG. 10 is a terminal device is used.

In a possible implementation, the processing module 1010 is configured to receive, by using the receiving module 1030 through a distributed unit of a first network device, first indication information sent by a central unit of the first network device. The first indication information indicates a first resource of a configured grant of the terminal device, and the first resource is associated with a first SSB. The processing module 1010 is configured to determine, in an inactive state based on the first SSB, whether to send data by using the first resource.

In a possible implementation, the processing module 1010 is configured to receive, by using the receiving module 1030, first indication information sent by a second network device. The first indication information indicates a first resource of a configured grant of the terminal device, and the first resource is associated with a first SSB. The terminal device determines, in the inactive state based on the first SSB, whether to send data by using the first resource. It should be noted that the second network device may be a network device to which the terminal device is handed over from a first network device, or may be a network device before the terminal device is handed over from the first network device.

In a possible implementation, the processing module 1010 is configured to: determine, in the inactive state based on reference signal received power RSRP of the first SSB, whether uplink synchronization of the first resource is invalid; and when it is determined that uplink synchronization of the first resource is valid, determine to send data by using the first resource; or when it is determined that uplink synchronization of the first resource is invalid, determine not to send data by using the first resource.

In a possible implementation, the processing module 1010 is configured to: in the inactive state, release the first resource when it is determined that uplink synchronization of the first resource is invalid.

In a possible implementation, that the processing module 1010 is configured to determine, in the inactive state based on the RSRP of the first SSB, whether uplink synchronization of the first resource is invalid includes: When the RSRP of the first SSB is greater than or equal to a first threshold, the processing module 1010 determines that uplink synchronization of the first resource is valid. When an increase variation of the RSRP of the first SSB is greater than or equal to a second threshold, or when a decrease variation of the RSRP of the first SSB is greater than or equal to a third threshold, the processing module 1010 determines that uplink synchronization of the first resource is invalid.

In a possible implementation, the processing module 1010 is configured to receive, by using the receiving module 1030 through the distributed unit of the first network device, second indication information sent by the central unit of the first network device. The second indication information indicates a second resource of the configured grant of the terminal device, and the second resource of the configured grant is used by the terminal device to send data by using the second resource in the inactive state and a connected state.

In a possible implementation, the processing module 1010 is configured to receive, by using the receiving module 1030, second indication information sent by the second network device. The second indication information indicates a second resource of the configured grant of the terminal device, and the second resource is used by the terminal device to send data by using the second resource in the inactive state and the connected state.

In a possible implementation, the processing module 1010 is configured to be restored to the connected state by using a context of the terminal device that is obtained by the second network device, and the context of the terminal device is obtained by receiving by the second network device and is from the central unit of the first network device.

Optionally, the communication apparatus 900 or the communication apparatus 1000 may further include a storage unit. The storage unit is configured to store data or instructions (which may also be referred to as code or a program). The foregoing units may interact with or be coupled to the storage unit, to implement a corresponding method or function. For example, the processing module 9010 or the processing module 1010 may read the data or the instructions in the storage unit, so that the communication apparatus implements the method in the foregoing embodiments.

It should be understood that division into units in the apparatus is merely logical function division. During actual implementation, all or some of the units may be integrated into one physical entity or may be physically separated. In addition, all the units in the apparatus may be implemented in a form of software invoked by a processing element, or may be implemented in a form of hardware; or some units may be implemented in a form of software invoked by a processing element, and some units may be implemented in a form of hardware. For example, each unit may be a separately disposed processing element, or may be integrated into a chip of the apparatus for implementation. In addition, each unit may alternatively be stored in a memory in a form of a program to be invoked by a processing element of the apparatus to perform a function of the unit. In addition, all or some of the units may be integrated, or may be implemented independently. The processing element herein may also be referred to as a processor, and may be an integrated circuit having a signal processing capability. In an implementation process, the steps in the foregoing methods or the foregoing units may be implemented by using an integrated logic circuit of hardware in the processor element, or may be implemented in a form of software invoked by the processing element.

In an example, a unit in any one of the foregoing apparatuses may be one or more integrated circuits configured to implement the foregoing methods, for example, one or more application-specific integrated circuits (ASIC), one or more microprocessors (DSP), one or more field programmable gate arrays (FPGA), or a combination of at least two of these forms of integrated circuits. For another example, when the units in the apparatus may be implemented in a form of scheduling a program by the processing element, the processing element may be a general purpose processor, for example, a central processing unit (CPU) or another processor that can invoke the program. For still another example, the units may be integrated and implemented in a form of a system-on-a-chip (SOC).

The foregoing unit (for example, a receiving unit) for receiving is an interface circuit of the apparatus, and is configured to receive a signal from another apparatus. For example, when the apparatus is implemented in a manner of a chip, the receiving unit is an interface circuit that is of the chip and that is configured to receive a signal from another chip or apparatus. The foregoing unit (for example, a sending unit) for sending is an interface circuit of the apparatus, and is configured to send a signal to another apparatus. For example, when the apparatus is implemented in the manner of the chip, the sending unit is an interface circuit that is of the chip and that is configured to send a signal to another chip or apparatus.

Figure 11:
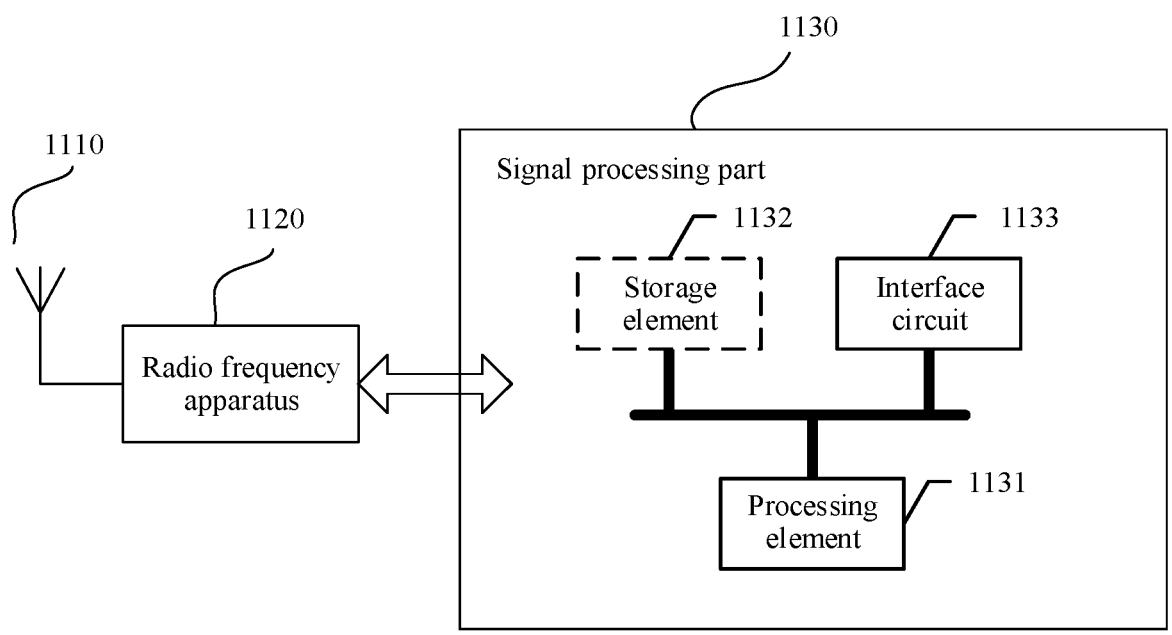
FIG. 11 is a schematic diagram of a communication device according to an embodiment of this application.

FIG. 11 is a schematic diagram of a structure of a communication device according to an embodiment of this application. The communication device is configured to implement an operation performed by the first network device or the central unit in the first network device, the second network device, or the terminal device in the foregoing embodiments. As shown in FIG. 11, for example, the communication device is a first network device, a second network device, or a terminal device. The communication device includes an antenna 1110, a radio frequency apparatus 1120, and a signal processing part 1130. The antenna 1110 is connected to the radio frequency apparatus 1120. In a downlink direction, the radio frequency apparatus 1120 receives, through the antenna 1110, information sent by a network device or another terminal device, and sends, to the signal processing part 1130 for processing, the information sent by the network device or the another terminal device. In an uplink direction, the signal processing part 1130 processes information of the terminal device, and sends the information to the radio frequency apparatus 1120. The radio frequency apparatus 1120 processes the information of the terminal device, and then sends the processed information to the network device or the another terminal device through the antenna 1110.

For example, the communication device is a network device. The communication device includes an antenna 1110, a radio frequency apparatus 1120, and a signal processing part 1130. The antenna 1110 is connected to the radio frequency apparatus 1120. In an uplink direction, the radio frequency apparatus 1120 receives, through the antenna 1110, information sent by a terminal device, and sends, to the signal processing part 1130 for processing, the information sent by the terminal device. In a downlink direction, the signal processing part 1130 processes information of the network device, and sends the information to the radio frequency apparatus 1120. The radio frequency apparatus 1120 processes the information of the network device, and then sends the processed information to the terminal device or another terminal device through the antenna 1110.

The signal processing part 1130 is configured to implement processing on each communication protocol layer of data. The signal processing part 1130 may be a subsystem of the communication device, and the communication device may further include another subsystem, for example, a central processing subsystem configured to process an operating system and an application layer that are of the communication device, and for another example, a peripheral subsystem configured to implement a connection to another device. The signal processing part 1130 may be a separately disposed chip. Optionally, the foregoing apparatus may be located in the signal processing part 1130.

The signal processing part 1130 may include one or more processing elements 1131, for example, include a main control CPU and another integrated circuit, and further include an interface circuit 1133. In addition, the signal processing part 1130 may further include a storage element 1132. The storage element 1132 is configured to store data and a program. A program for performing the methods performed by the communication device in the foregoing methods may be stored in the storage element 1132, or may not be stored in the storage element 1132, for example, stored in a memory outside the signal processing part 1130 and loaded by the signal processing part 1130 into a cache for use. The interface circuit 1133 is configured to communicate with an apparatus. The foregoing apparatus may be located in the signal processing part 1130. The signal processing part 1130 may be implemented by using a chip. The chip includes at least one processing element and an interface circuit. The processing element is configured to perform the steps in any one of the foregoing methods performed by the communication device. The interface circuit is configured to communicate with another apparatus. In an implementation, units that implement the steps in the foregoing methods may be implemented in a form of scheduling a program by a processing element. For example, the apparatus includes a processing element and a storage element. The processing element invokes a program stored in the storage element, to perform the methods performed by the communication device in the foregoing method embodiments. The storage element may be a storage element located on a same chip as the processing element, namely, an on-chip storage element.

In another implementation, a program used to perform the methods performed by the communication device in the foregoing methods may be in a storage element located on a different chip from the processing element, namely, an off-chip storage element. In this case, the processing element invokes the program from the off-chip storage element or loads the program to the on-chip storage element, to invoke and perform the method performed by the communication device (the first network device, the second network device, or the terminal device) in the foregoing method embodiments.

In still another implementation, the units of the communication device that implement the steps in the foregoing methods may be configured as one or more processing elements. The processing elements are disposed on the signal processing part 1130. The processing element herein may be an integrated circuit, for example, one or more ASICs, one or more DSPs, one or more FPGAs, or a combination of these types of integrated circuits. These integrated circuits may be integrated together to form a chip.

The units for implementing the steps in the foregoing methods may be integrated together and implemented in a form of a system-on-a-chip (SOC). The SOC chip is configured to implement the foregoing methods. At least one processing element and a storage element may be integrated into the chip, and the processing element invokes a program stored in the storage element to implement the foregoing method performed by the communication device. Alternatively, at least one integrated circuit may be integrated into the chip, to implement the foregoing method performed by the communication device. Alternatively, with reference to the foregoing implementations, functions of some units may be implemented by invoking a program by the processing element, and functions of some units may be implemented by the integrated circuit.

It can be learned that the foregoing apparatus may include at least one processing element and an interface circuit. The at least one processing element is configured to perform any method performed by the communication device provided in the foregoing method embodiments. The processing element may perform some or all steps performed by the communication device in a first manner, that is, by invoking a program stored in the storage element; or may perform some or all steps performed by the communication device in a second manner, that is, by combining instructions and a hardware integrated logic circuit in the processing element. Certainly, some or all steps performed by the communication device may alternatively be performed by combining the first manner and the second manner.

As described above, the processing element herein may be a general-purpose processor, for example, a CPU, or may be one or more integrated circuits configured to implement the foregoing methods, for example, one or more ASICs, one or more microprocessors DSPs, one or more FPGAs, or a combination of at least two of the integrated circuits. The storage element may be one memory, or may be a general term of a plurality of storage elements.

It may be understood that the memory in embodiments of this application may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. It is illustrated by way of example, and not limitation, that many forms of RAM are available, such as a static random access memory (Static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory of the systems and methods described in this specification includes but is not limited to these and any memory of another proper type.

An embodiment of this application further provides a computer-readable storage medium. The computer-readable storage medium stores a computer program. When the computer program is executed by a computer, the method in any one of the foregoing method embodiments applied to the first network device, the second network device, or the terminal device is implemented.

An embodiment of this application further provides a computer program product. When the computer program product is executed by a computer, the method in any one of the foregoing method embodiments applied to the first network device, the second network device, or the terminal device is implemented.

It should be noted that terms such as "first" and "second", for example, "first indication information and second indication information", are merely used for a purpose of distinguishing for description, and should not be construed as indicating or implying relative importance or construed as indicating or implying a sequence. "At least one" means one or more, and "a plurality of" means two or more. "And/Or" is an association relationship for describing associated objects, and represents that three relationships may exist. For example, A and/or B may represent the following cases: Only A exists, both A and B exist, and only B exists, where A and B may be in a singular form or a plural form. The character "/" generally indicates an "or" relationship between the associated objects. In addition, "at least one of the following items (pieces)" or a similar expression thereof indicates any combination of these items, including a single item (piece) or any combination of a plurality of items (pieces). For example, at least one item (piece) of a, b, or c may represent: a, b, c, a and b, a and c, b and c, or a, b, and c, where a, b, and c may be singular or plural.

All or some of the foregoing embodiments may be implemented by using software, hardware, firmware, or any combination thereof. When software is used to implement embodiments, all or some of embodiments may be implemented in a form of a computer program product. The computer program product includes one or more computer programs. When the computer programs are loaded and executed on a computer, all or some of the procedure or functions according to embodiments of this application are generated. The computer may be a general-purpose computer, a dedicated computer, a computer network, or other programmable apparatuses. The computer programs may be stored in a computer-readable storage medium or may be transmitted from a computer-readable storage medium to another computer-readable storage medium. For example, the computer programs may be transmitted from a website, computer, server, or data center to another web site, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive ( )), or the like.

An embodiment of this application further provides a processing apparatus, including a processor and an interface. The processor is configured to perform the method in any one of the foregoing method embodiments applied to the first network device, the second network device, or the terminal device.

It should be understood that the foregoing processing apparatus may be a chip, and the processor may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in a memory. The memory may be integrated into the processor, or may be located outside the processor and exist independently.

The foregoing descriptions are merely specific implementations of this application, but are not intended to limit the protection scope of embodiments of this application. Any variation or replacement readily figured out by a person skilled in the art within the technical scope disclosed in embodiments of this application shall fall within the protection scope of embodiments of this application. Therefore, the protection scope of embodiments of this application should be subject to the protection scope of the claims.

What is claimed is:

1. A communication method, wherein the method comprises:
   receiving, by a central unit of a first network device, a retrieve user equipment (UE) context request from a second network device;
   sending, by the central unit of the first network device, a context of a terminal device in an inactive state to the second network device;
   performing, by the first network device, identity verification with reference to a security context in the first network device and verification information in the retrieve UE context request; and
   after performing the identity verification, sending, by the central unit of the first network device, a first message to a distributed unit of the first network device, wherein the first message indicates the distributed unit of the first network device to release a context of the terminal device, and wherein sending, by the central unit of the first network device, a first message to a distributed unit of the first network device comprises:
   after the identity verification succeeds, sending, by the central unit of the first network device, the first message to the distributed unit of the first network device.

2. The method according to claim 1, wherein the context comprises one or more of the following:
   a configured grant configured for the terminal device;
   configuration information of a physical downlink control channel (PDCCH) configured for the terminal device;
   a temporary identifier for scrambling the PDCCH;
   an inactive radio network temporary identifier (I-RNTI) configured for the terminal device; or
   configuration information of a radio link control (RLC) layer corresponding to a radio bearer configured for the terminal device.

3. The method according to claim 1, wherein the terminal device is configured to transmit data to the first network device while the terminal device is in the inactive state.

4. A communication apparatus, wherein the communication apparatus comprises:
   at least one processor; and
   a memory coupled to the at least one processor and configured to store executable instructions for execution by the at least one processor to instruct the at least one processor to:
   receive a retrieve user equipment (UE) context request received from a second network device;
   send a context of a terminal device in an inactive state to the second network device;
   perform identity verification with reference to a security context in a first network device and verification information in the retrieve UE context request; and
   after performing the identity verification, send a first message to a distributed unit of a first network device, wherein the first message indicates the distributed unit of the first network device to release a context of the terminal device, and wherein send a first message to a distributed unit of the first network device comprises:
   after the identity verification succeeds, send the first message to the distributed unit of the first network device.

5. The apparatus according to claim 4, wherein the context comprises one or more of the following:
   a configured grant configured for the terminal device;
   configuration information of a physical downlink control channel (PDCCH) configured for the terminal device;
   a temporary identifier for scrambling the PDCCH;
   an inactive radio network temporary identifier (I-RNTI) configured for the terminal device; or
   configuration information of a radio link control (RLC) layer corresponding to a radio bearer configured for the terminal device.

6. The apparatus according to claim 4, wherein the terminal device is configured to transmit data to the first network device while the terminal device is in the inactive state.

7. A communication method, wherein the method comprises:
   receiving, by a central unit of a first network device, a retrieve user equipment (UE) context request received from a second network device;
   sending, by the central unit of the first network device, a context of a terminal device in an inactive state to the second network device;
   performing, by the first network device, identity verification with reference to a security context in the first network device and verification information in the retrieve UE context request; and
   after performing the identity verification, sending, by the central unit of the first network device, a first message to a distributed unit of the first network device, wherein the first message indicates the distributed unit of the first network device to release a context of the terminal device, and wherein sending, by the central unit of the first network device, a first message to a distributed unit of the first network device comprises:
   after the identity verification succeeds, sending, by the central unit of the first network device, the first message to the distributed unit of the first network device; and
   receiving, by the distributed unit of the first network device, the first message.

8. The method according to claim 7, wherein the context comprises one or more of the following:
   a configured grant configured for the terminal device;
   configuration information of a physical downlink control channel (PDCCH) configured for the terminal device;
   a temporary identifier for scrambling the PDCCH;
   an inactive radio network temporary identifier (I-RNTI) configured for the terminal device; or
   configuration information of a radio link control (RLC) layer corresponding to a radio bearer configured for the terminal device.

9. The method according to claim 7, wherein the terminal device is configured to transmit data to the first network device while the terminal device is in the inactive state.

10. The method according to claim 7, wherein the method further comprises:
    receiving, by the distributed unit of the first network device, indication information for storing a context of the terminal device; and
    storing a context of the terminal device according to the indication information.

11. A communication system, comprising a central unit of a first network device and a distributed unit of the first network device; wherein
    the central unit of the first network device is configured to:
    receive a retrieve user equipment (UE) context request received from a second network device;
    send a context of a terminal device in an inactive state to the second network device;

perform identity verification with reference to a security context in the first network device and verification information in the retrieve UE context request; and after performing the identity verification, send a first message to a distributed unit of the first network device, wherein the first message indicates the distributed unit of the first network device to release a context of the terminal device, wherein send a first message to a distributed unit of the first network device comprises: after the identity verification succeeds, send the first message to the distributed unit of the first network device; and the distributed unit of the first network device is configured to:

receive the first message.

12. The system according to claim 11, wherein the context comprises one or more of the following:

a configured grant configured for the terminal device;

configuration information of a physical downlink control channel (PDCCH) configured for the terminal device;

a temporary identifier for scrambling the PDCCH;

an inactive radio network temporary identifier (I-RNTI) configured for the terminal device; or configuration information of a radio link control (RLC) layer corresponding to a radio bearer configured for the terminal device.

13. The system according to claim 11, wherein the distributed unit of the first network device is further configured to:

receive indication information for storing a context of the terminal device; and store a context of the terminal device according to the indication information.

14. The system according to claim 11, wherein the system comprises the terminal device that is configured to transmit data to the first network device while the terminal device is in the inactive state.

15. The method according to claim 1, further comprising: sending indication information for storing a context of the terminal device.

16. The apparatus according to claim 4, wherein the executable instructions further instruct the at least one processor to: send indication information for storing a context of the terminal device.

17. The method according to claim 1, further comprising: receiving data from the terminal device while the terminal device is in the inactive state.

18. The apparatus according to claim 4, wherein the executable instructions further instruct the at least one processor to: receive data from the terminal device while the terminal device is in the inactive state.

19. The method according to claim 7, wherein the method further comprises:

sending, by the central unit of the first network device, indication information for storing a context of the terminal device.

20. The method according to claim 7, wherein the method further comprises:

receiving data from the terminal device while the terminal device is in the inactive state.

21. The system according to claim 11, wherein the central unit of the first network device is configured to:

send indication information for storing a context of the terminal device.

* * * * *